United States Patent [19]

Park

[11] E Re. 29,485

[45] Reissued Nov. 29, 1977

[54] METHOD OF EFFECTING FAST TURBINE VALVING FOR IMPROVEMENT OF POWER SYSTEM STABILITY

[76] Inventor: Robert H. Park, Main St., Brewster, Mass. 02631

[21] Appl. No.: 630,724

[22] Filed: Nov. 10, 1975

Related U.S. Patent Documents

Reissue of:

[64] Patent No.: 3,848,138
Issued: Nov. 12, 1974
Appl. No.: 388,619
Filed: Aug. 15, 1973

U.S. Applications:

[63] Continuation-in-part of Ser. No. 244,594, April 17, 1972.

[51] Int. Cl.[2] ..... F01K 13/02

[52] U.S. Cl. ..... 290/40 R; 60/664; 361/53

[58] Field of Search ..... 307/52, 85; 290/40; 60/664; 317/21

[56] References Cited

U.S. PATENT DOCUMENTS

| | | | |
|---|---|---|---|
| 3,421,014 | 1/1969 | Moorganov | 290/40 |
| 3,515,893 | 6/1970 | Park | 290/40 |

*Primary Examiner*—Robert K. Schaefer
*Assistant Examiner*—J. W. Redman

[57] ABSTRACT

As an improved way of effecting fast valving of turbines of power system steam-electric generating units for the purpose of improving the stability of power transmission over transmission circuits to which their generators make connection , when stability is threatened by line faults and certain other stability endangering events, and in which intercept valves are rapidly closed on a momentary basis, the procedure of intercept valve closure is supplemented by simultaneously initiating turbine and steam supply source control programs, which (a) [being] *bring* into effect a sustained reduction in turbine driving power via employment of measures which may include full closing of some or all control valves and/or employment of preprogrammed control valve repositioning, with provision to automatically divert high pressure steam to the condenser or to atmosphere as a way to prevent discharge of steam through high pressure safety valves. (b) bring into effect a rapidly executed process of reduction of rate of generation of steam within steam supply sources, and (c) initiate a control program that effects a predetermined degree of partial reopening of intercept valves early in the course of the generator rotor's first backward swing, following which intercept valves are further opened and control valve positions optionally revised in preprogrammed ways with the overall effect that in the period following the first forward swing the magnitude of turbine driving power is caused to hold below the value that applied prior to the event that initiated fast valving and to at most only briefly exceed a final sustained value that can be preset.

17 Claims, 5 Drawing Figures

METHOD OF EFFECTING FAST TURBINE VALVING FOR IMPROVEMENT OF POWER SYSTEM STABILITY

Matter enclosed in heavy brackets [ ] appears in the original patent but forms no part of this reissue specification; matter printed in italics indicates the additions made by reissue.

CROSS REFERENCE TO RELATED INVENTIONS

My invention relates in its principal aspect to means for rapidly controlling power flow within power transmission elements of interconnected power systems with a view to favorably affecting the stability of such systems when jeopardized by suddenly occurring adverse events. This patent application is subject matter related to my issued U.S. Pat. Nos. 3,051,842, Re. 26,571, 3,515,893, which has reissued as Re. 27,482 and 3,657,552, and is a continuation in part of my copending U.S. Pat. application, Ser. No. 244,594 filed Apr. 17, 1972.

BACKGROUND OF THE INVENTION

1. Field of Invention

The area of utility of the invention comprises prevention of development of system instability within power systems when threatened by transmission line faults, and certain other system stability endangering events.

The area of method comprises responding to faults and other events that could endanger system stability by rapidly initiating preprogrammed processes of a. full or partial closure of valves controlling input of steam to steam turbine type generator prime movers of power systems, effected within ¼ second, followed by full or partial valve reopening, effected within a matter of one or more seconds, with provision of valves that automatically by-pass steam either to the condenser or to atmosphere as a way to prevent discharge of steam through high pressure safety valves.

b. effecting a sustained reduction of the rate of steam generation within steam supply sources within a period of 5 to 15 seconds up to as much as one minute *or* more.

2. Prior Art

First published prior art in the area of fast prime mover driving power control for stability improvement came in 1929 (1) (Numbers in parentheses refer to Table of References.) and the first published description of a successful reduction to practice in 1931 (2).

U.S. Pat. No. 1,935,292 which issued in 1933 (3), in which a Pelton wheel was shown as the source of driving power, provides a good picture of early control concepts, *which were based only on momentary valve closure.*

Reference 4 is mainly of interest in that it had the effect of deflecting interest from both fast turbine valving and momentary application of braking load.

Reference 5 which was published in 1934 cited the findings of reference 2, and led to a sequence of USSR studies of fast steam turbine valving for system stability improvement (5, 6, 7, 10, 11, 12, 13, 17), and one U.S. patent (18).

In 1962 reference 21 introduced the concept of providing to [vary] *rapidly bring into effect a sustained partial reduction of turbine driving power as a means of favorably affecting system stability when threatened by a line fault. However, though, as it happened, at the point in time when the application that included it was first filed, the concept was not only novel, but, as events have shown, non obvious, claims were limited to varying* the nature of a preprogrammed process of turbine valving in response to the extent and distribution of prefault transmitted load.

In 1966 reference 22 which was reissued in 1969 (23) introduced the concept of employing fast valving *of the sustained reduction of driving power type,* and *momentary application of* braking load, in combination, and of preprogrammed response to the post-fault event of unsuccessful reclosure of faulted line circuit breakers.

Beginning in 1961 the writer undertook to solicit interest on the part of power producers and turbine generator manufacturers in fast turbine valving optionally supplemented by momentary application of braking load.

Meetings were held with GE and Westinghouse engineers and, following the 1965 Northeast U.S. blackout, GE engineers presented a paper on fast valving at the 1966 American Power Conference (24).

This 1966 GE paper stimulated interest in *momentary type* fast turbine valving on the part of a number of U.S. power producers, and led to the publication of several papers (25, 26, 27, 28, 29, 30).

In February 1966 the writer filed a patent application which issued as U.S. Pat. No. 3,515,893 (31), and subsequently filed for reissue of this patent (32) and in 1968 presented a paper at the American Power Conference (33) which dealt in large measure with what had been set forth in the application for the patent, *which included, among other things, sustained type fast turbine valving, used alone or in combination with momentary application of braking load.*

As early as April 1964 the writer began to look into what was available in the way of power operated relief valves [both] that could be used to divert or dump high pressure steam to atmosphere or the condenser as a way to prevent discharge of steam through high pressure safety valves when high pressure turbine steam acceptance was reduced by closure of control valves, and in reference 31 cited the concept of programming initiation of the opening of such valves as an aspect of fast valving control procedures (as see reference 34). [column 19 par. 2).]

A 1966 review of U.S.S.R. references revealed that, as of 1965, in the U.S.S.R., certain once-through steam-electric installations were equipped with fast acting valves that would by-pass steam around the high pressure turbine to the cold end of the *reheater* as control valves closed, thereby avoiding both safety valve lifting and boiler problems, and *also valves that,* at the same time would by-pass steam from the hot end of the reheater to the condenser, (14, 15) using, for the purpose, valves of a special type that incorporated provision for desuperheating and that, as it later appeared, were at that time being provided in once-through type boilers of German steam-electric installations where they were used during startups and to make possible [sudden step] *rapid speed responsive* reductions in unit load (35, 39). This type of valving, therefore represented one approach to a solution of the problem of safety valve lifting though not an approach that could easily be applied in U.S. type steam-electric installations.

*In the fall of 1966 the writer proposed, in a meeting with engineers of Southern California Edison, that provision be made for sustained type fast valving and momentary dynamic braking of 795 mw steam-electric units Nos. 4 and 5, of the Four Corners steam station as a way to preserve system stability on loss of the single circuit 500 kv line leading across Arizona to a 500 kv SCE substation located near the California-Arizona border.*

*This led, in due course, to joint Southern California Edison and Arizona Public Service system studies which were reported on in a 1968 AIEE paper (25), and to an SCE decision to specify that the turbines in question would be equipped to allow employment of sustained type fast valving.*

*In his 1968 paper (33) the writer made the point that steam by-passing could be used to prevent safety valve lifting, and for other purposes, including protection of reheaters, and also made reference to rapid fuel reduction as a way to avoid excessive excursions in temperature of superheaters and reheaters and, in these connections, cited a group of references including the above cited U.S.S.R. references and also U.S. papers dealing with rapid reduction of fuel supply.*

[In] *As of* 1966 the writer [ran] *had run* into the fact, that whereas in once-through type boilers it is practice to provide by-pass valves to the flash tank of the boiler, for the purpose of discharging water to the flash tank during the startup process, the point applied that when these valves are opened under load conditions, steam passes through them to the flash tank and [thence to the condenser], which suggested that it might be that, since Babcock & Wilcox's once-through boilers are equipped with fast *potentially* acting (air operated) type valves that by-pass the primary superheater, fast initiation of their opening might operate to prevent safety valve blowing on fast closure of turbine control valves, or, at any rate, that this could be the case if in the event of fast full closure fast closing was promptly followed in sufficient degree by fast partial reopening.

The fact that fast opening of the *by-pass* valves in question could prevent safety valve lifting was eventually confirmed, when, in 1969, tests on a 600 megawatt steam-electric unit incorporating a Babcock & Wilcox oil fired boiler demonstrated that with use of preprogrammed fast *initiation of* opening of the primary superheater by-pass valves it was possible to trip the unit at full load without blowing safety valves, and, by, at the same time, reducing oil supply to 10 percent in 8 seconds, after another minute or so, resynchronize and begin to reload, and fully reload in 20 minutes (37).

Moreover [based on] unpublished information which the writer had been furnished by the GE in 1966 (38) *was* to the effect that a 50 percent sudden step reduction of turbine driving power would not cause significant damage to fossil fuel type turbines. Also information was obtained from Babcock & Wilcox [he was aware of the fact] *to the effect* that even for the case of coal firing, a 40 to 50 percent reduction in fuel feed could be achieved [in] rapidly enough to avoid development of excessive reheater and superheater temperature.

Putting all these facts together made it appear that fast turbine valving of a type that would effect no more than a 40 to 50 percent sustained step reduction of the steam acceptance of a high pressure turbine of any fossil fuel steam-electric installation, whether or not coal fired, *with absence of high pressure safety valve lifting* would represent an entirely feasible thing, and that in the case of Babcock & Wilcox once-through boilers already equipped with fast acting by-pass valves, also something that would involve little expense.

This information was communicated to the Tennessee Valley Authority, with which the writer had and presently retains a consulting arrangement, and eventually led to a decision to apply the scheme to unit No. 2 of TVA's Cumberland generating station (36).

The information contained in reference 37 was also furnished to the Chief Mechanical Engineer of Southern California Edison, in the context of employment of the principle of fast opening of the by-pass valves to the flash tank of the Babcock & Wilcox boilers of two jointly owned 800 mw steam-electric units located in the Four Corners, New Mexico plant of Arizona Public Service, as a hitherto unrecognized as feasible, very simple way to provide the steam by-pass capability needed to allow fast valving these units to half load, whereby to avoid need to trip-off one unit in response to the occurrence of a fault on the 500 kv line leading from Four Corners to Los Angeles and do so while avoiding lifting of safety valves.

*However, though, in 1971 there was presentation of a technical paper (67) authored by engineers of the Los Angeles division of Bechtel Corp., which dealt with provision, at Four Corners, for use of fast valving of the sustained reduction of driving power type, achieved with combined use of preprogrammed sustained partial control valve closure and fast runback of steam generation, this paper makes no reference to providing so that by-passing of high pressure steam to the condenser, via the flash tank, will take place when, under heavy load conditions, a line fault would cause fast valving to come into effect.*

Also the writer supplied a copy of reference 37 to a Working Group of the System Design Task Force of the New England power systems, that had been directed to carry out a study of fast valving. However in their report of their studies, though the Task Force discussed what was disclosed in reference 37, this was done only in the context that it demonstrated feasibility of tripping turbine generators of once-through steam-electric units to auxiliary load and rapidly resynchronizing and reloading (40).

*Again, though the report noted that performance advantages could result from providing to close control as well as intercept valves, it was stated that, in the case of fossil fuel units, the result would be lifting of boiler safety valves, combustion and feedwater control problems, turbine thermal stresses, transient thrust unbalance, and overloading of the last few high pressure stages.*

*The report goes on to add that a turbine by-pass system closely coordinated with the turbine control valves could alleviate the problems cited, but would add cost and complexity, following which statement no further reference is made to control valve closure, except the statement having reference to nuclear turbines "As with a fossil unit, fast valving of the interceptor valve is employed as the most practical procedure."*

*An aspect of the report that bears on the obviousness of claimed subject matter of the present invention is that it fails to make any reference to the fact that it is possible to prevent lifting of safety valves, merely by providing fast acting power operated relief or by-pass valves which do not have to be coordinated with the turbine's control valves, but rather, as provided for in the present invention, would be*

*arranged to open and close in response to changes in steam pressure.*

The above and other information that could be cited [makes evident] *suggests* that it was not obvious to the power systems engineers involved that in the case of [once through boiler type] *both fossil fuel and nuclear* steam supply systems of U.S. type *there* were viable ways to employ fast turbine valving of a type in which a program of rapidly executed control valve [momentary and] sustained partial closure [was] *would be* made use of as a way to prevent loss of system stability and avoid need to trip-off generation, while avoiding lifting of safety valves, and that, in the case of Babcock & Wilcox once-through type boilers, this could be done without need to provide by-pass valve capability beyond or different from that already available.

Moreover non obviousness of the feasibility of safely employing fast control valve closure either on a momentary or sustained *partial closure* basis is confirmed by reference 24, which, though it cited the startup by-pass system, did so only in the context of its function as something adapted to protect the boiler, rather than as a potentially effective means of preventing lifting of safety valves (41), and also [be] *by* reference 29 which advises that the GE stand is in opposition to employment of fast reduction in high pressure turbine steam acceptance via "fast action in the control valves as a supplement to fast closing of intercept valves" and cited by way of explanation "possible repercussion on the boiler safety valves and boiler control" (42), a view that is also expressed in reference 27 (43).

*In relation to nuclear plants, reference 27, which was authored by a Westinghouse engineer, discussed feasibility and endorsed momentary type fast valving, while reference 28, the authors of which were Bechtel and Baltimore Gas and Electric engineers, proposed employment of momentary type fast valving at BG&E's Calvert Cliffs nuclear plant.*

*While both GE and Westinghouse were awarded Calvert Cliffs turbine contracts that called for making provision for momentary type fast valving, beginning in 1970 GE began to warn its customers, including BG&E and TVA, that it would be undesirable to plan to employ it in nuclear plants, because, in addition to problems of,*

*a. greater control complexity, and*

*b. additional duty on intercept valves,*

*that fast valving would introduce even in the case of fossil fuel installations, in nuclear plants there would be, in addition, further more serious problems having relation to the hazard that fast valving might cause*

*c. surges of drain water in the moisture separator drain systems due to flashing of water into steam as a result of decay of moisture separator reheater (MSR) pressure, with a resultant hazard of damage to piping together with a possibility of water entry into low pressure turbines, and*

*d. increased need for maintenance of GE's large plug type intercept valves, due to the fact that, with use of fast valving, they would be called on to open against full MSR pressure, a requirement that does not have to be met in the case of a turbine trip, even if the trip is to auxiliary load.*

*Also GE stated that fast valving of a nuclear unit would cause*

*e. certain blowing of MSR pressure safety valves.*

*These warnings had the effect of causing the bulk of those power producers that had already planned to make provision for employment of momentary type fast valving in nuclear installations, including BG&E, to give up their plans.*

*One exception was New England where there was a decision to provide for momentary closure of intercept valves at Maine Yankee, a PWR type nuclear installation incorporating a Westinghouse reactor, plus a Westinghouse turbine that would incorporate butterfly type intercept valves.*

*Another exception was the TVA, which, despite GE's warnings and its failure to bid on provision of fast valving, opted to provide for employment of the sustained type, achieved with employment of sustained partial control valve closure in its Watts Bar, and subsequently, also, in its Bellefonte nuclear stations, in which Westinghouse and Brown Boveri respectively, were the successful turbine-generator bidders.*

Also it is interesting to note that references 24 *and 26* through 30 and reference 40 as well, fail to propose turbine control valve momentary full or partial closure as a way to prevent discharge of steam through reheater and moisture-separator-reheater pressure safety valves and a chance of need to schedule a shut down for valve [maintainance,] *maintenance,* when fast valving is effected.

*Nor, in such of these papers as include reference to nuclear installations, is reference made to the point that, in PWR and, to a lesser extent, also in the case of BWR nuclear installations, the availability of by-pass systems that discharge to the condenser renders it possible to employ fast valving in such installations without hazard of discharge of steam through low pressure safety valves, when the valving provided for is of the sustained reduction of driving power type in which control valves are caused to rapidly partly close on a sustained basis, nor is there reference to the fact that because of these by-pass systems, high pressure safety valves will not lift so long as the extent of sustained reduction of high pressure turbine steam acceptance is held below the capacity of these systems.*

*In this connection, as was explained to TVA by GE, an attempt to provide for sustained type fast valving, sought to be effected with use of fast partial control valve closure, would present GE with a problem since, with GE's slow acting servo controls, which take 10 second to fully stroke GE's valves, it would not be possible to successfully employ these controls as a way to partly close control valves with the speed that would be needed, while, further, it would be difficult to provide to rapidly close the valves part way with use of valve actuator oil dumping.*

*In this matter, the unwillingness of GE to consider employment of fast preprogrammed partial control valve closure stands in contrast to the fact that GE was prepared to make available, as another way to make possible improvement in system stability, provision for separation of generators of nuclear plants from transmission networks in response to line faults or other network problems, and for operation at house load to be followed by prompt resynchronizing and reloading, a feature that GE quoted on and provided for in the case of Millstone Point #1 (40) and Vermont Yankee, where the BWR type reactors that GE supplied were equipped with 100 percent by-pass systems.*

*Here a point that applies is that provision for trip to auxiliary load, as made in the case of these plants avoided problems (c), (d) and (e), listed above, as well as any requirement to make provision of servo valves of increased size.*

*In this overall situation the TVA accepted a position advanced by the writer, that use of sustained type fast valving effected with the benefit of fast partial closure of*

*control valves, achieved with use of servo valves of sufficient size to provide needed speed, plus provision for fast partial opening of intercept valves would eliminate problem (e), and also largely minimize problem (c), while they also accepted that Westinghouse and BBC turbines, employing butterfly valves, would, as per the assurances of the manufacturers, provide a solution to problem (d).*

*In contrast, at Maine Yankee, instead of electing to employ sustained type fast valving, as previously noted, the decision was to use fast valving of momentary type, the effect being, especially since, also, no objection was made to slow reopening of butterfly type intercept valves, that advantageous solutions to problems (e) and (c) were not provided, while in addition, the penalty was incurred that post fault driving power exceeded rather than fell below pre-fault value.*

Thus U.S. engineers have shied away from employment of fast control valve repositioning as an aspect of fast turbine valving for system stability improvement based on the opinion that problems that could not be readily solved stood in the way, and for this reason have favored restriction in the scope of fast valving procedures notwithstanding *the fact that,* on the basis of this policy benefits that fast valving could provide when control valve repositioning is employed could not be realized.

The present invention shows how penalties that were visualized as applying when control valve repositioning is employed as an aspect of fast valving for system stability improvement can in some cases be gotten around with the benefit of only minor changes in boiler and turbine control systems and methods, and how also, where this is not feasible, costs involved in providing needed fast acting steam by-pass capability can be minimized.

When it comes to the changes in turbine control measures proposed in the present invention these include the concepts of rapidly partially reopening control and intercept valves.

In this connection the concept of merit in rapid reopening of intercept valves, with initiation of opening occurring at or in advance of the first forward swing of the generator rotor, [appear] *appears* to have been first publicly noted as desirable in reference 13 and was also noted in references 46, 47 and 49. However as going beyond what is put forward in those references the present invention calls, as suggested in reference 48 and 50, for at first rapidly opening intercept valves part way, and thereafter reopening them more slowly, and goes on to explain how this objective can be implemented.

While not a matter of public record it may be worthy of note that, as was brought out in a memo prepared by the writer and dated March 11th, 1964, copies of which were sent to Westinghouse engineers, the desirability of providing for the fast partial lifting of intercept valves was put forward in a Mar. 5, 1964 meeting with Westinghouse engineers and a representative of Westinghouse's Patent Dept.

In the memo the writer stated that his "fast governing" concept "would ideally call for" among other things A. Valve closing in response to an electrical signal such as an indication of a line fault
   a. Rapid closing of control and intercepting valves, as in a matter of ¼ second, followed by timed initiation of reopening, at the same rate, after a time interval in the range ⅛ to [¾/] ¾ second from the initiating signal
   b. Reopening at equal speed to a controlled valve opening which could correspond to a load equal to or lower than that prevailing prior to the initiation of closing operations.

Here the idea of providing for a variation in dead time was to allow for the fact that, as is well known to system planners, in some situations generator rotor swings peak as in 0.4 seconds, and in other cases, more slowly as in as much as 1 second, or more, with the effect that where slow enough peaking can be expected, a ¾ second delay in intercept valve reopening can be useful.

*Another novel use of control systems that is disclosed in the present application comprises the technique of closing some but not all of the control valves of a partial admission type high pressure turbine, at top speed, with the use of valve actuator oil dumping, as a simple way to provide for very fast partial reduction of the steam acceptance of turbines of that type.*

In the light of the foregoing the rendering feasible of employment of fast momentary *full and sustained* partial control valve closure by the methods which the writer has briefly outlined, and which are characterized by the fact that they are well adapted to implementation in the context of U.S. designs of steam-electric installations, as also the improvement of effecting fast only partial control and intercept valve reopening, which include among their advantages preventing of development of loss of synchronism on generator rotor swings, subsequent to the first, are viewed as novel and non obvious, and moreover the same is also thought to apply to the concept of effecting a sustained reduction of the driving power of turbines of BWR nuclear and other steam-electric installations by delaying full opening of intercept valves while tolerating discharge of steam through low or intermediate pressure safety valves over a period during which rate of generation of steam within the steam supply source is in process of being reduced on a preprogrammed basis.

In relation mainly to the prior art of fast valving taken as a whole, it may be in order to, at this point, take note of reference 18 comprising U.S. Pat. No. 3,421,014 which issued on Jan. 7, 1969.

This patent describes methods of fast valving steam turbines for system stability improvement which operate via employment of a feed-back type of control system, rather than a system of feed-forward type which characterize fast turbine valving techniques disclosed in the writer's patents and pending patent applications.

Also the patent in question makes no reference to steam by-pass systems, or to fast control of rate of steam generation within steam supply sources, even though in references 8, 9, and, apparently, also in 10, the inventor describes by-pass valve arrangements that allow discharging entrained steam to the condenser through the turbine's intercept valves.

From the above it does not appear that the patent anticipates what is set forth and claimed in the present application, while also this applies, as well, to what is set forth in references 8, 9 and 10.

Another point that may be worthy of note is that while in German once-through boiler type steam-electric installations which incorporated what can be termed German type by-pass systems provision was made for simultaneous fast closure of control and intercept valves, as in the case of U.S. Pat. 3,421,014 which has relation to USSR practice, valve repositioning was brought into effect on a feed-back basis, in response to speed increase, rather than in a preprogrammed manner adapted to cause valve position changes to take place independently of speed change.

Also it may be worthy of note that, in the period 1966 through 1968 the writer discussed the concept of rapidly effecting preprogrammed sustained reduction in the steam acceptance and driving power of [the] turbines that would be equipped with German type by-pass systems, in meetings with engineers of the consulting firm Ebasco Services, with engineers of Combustion Engineering and with the Chief Mechanical Engineer of Southern California Edison.

However, in the U.S., this type of by-pass system though at one time given a trial in a Combustion Engineering boiler was not viewed as worthy of use in U.S. installations based on the fact that expense would be high and that the valves could leak.

In 1969 the Chief Electrical Engineer of Ebasco Services helped to arrange so that the writer could meet at the 1969 American Power Conference with the author of reference 35, a representative of Siemens, and at this meeting and subsequently the writer endeavored to interest Siemens in offering provision for *line fault responsive* preprogrammed fast valving to potential turbine-generator purchasers[.], *as a means of improvement of power system stability.*

Later at the 1971 ASME-IEEE Joint Power Generation Conference the writer contacted the author of reference 65, and also representatives of the German turbine generator manufacturing firm of M.A.N. who were attending the meetings.

These contacts with Siemens and M.A.N. personnel, were supplemented by correspondence, and the transmittal to these firms of copies of references dealing with fast turbine valving, of preprogrammed type, as a way to improve system stability, but this activity on the part of the writer elicited no evidence of action when it came to dealing with potential customers.

This presumably, was due in part, to the fact that, whether in the U.S., or Germany, the subject of power system stability, typically, has hardly at all been understood by mechanical engineers of turbine generator manufacturing establishments.

At the present point in time the potentiality of *momentary type* fast valving for stability improvement is beginning to become clear to Europeans, as seen in this connection, sections 3.4, 3.5 and 5.8 of reference 66, and it will certainly be [ovbious] *obvious* to Europeans that fast closing and opening of control and intercept valves can easily be provided where German type by-pass systems are used.

Also in U.S. high temperature gas cooled, or HTGR, nuclear installations, German type by-pass systems are used, and it will be obvious how to apply preprogrammed fast control and/or intercept valve closing in these installations, as a way to improve power system stability.

However, though it would be obvious, in the light of the prior art, *how* to provide fast open valves subsequent to fast closure, there appears to the writer, to be no evidence that, *in reference 66, the position is taken that* it would be [obvious] *desirable* to rapidly reopen intercept valves part way and thereafter more slowly[.], *or, for that matter, that it would be desirable to hold control valves in a partly open position on a sustained basis.*

For this reason, in this application, when it comes to claims on fast partial reopening of intercept valves, the claims have not been restricted to apply to any particular type of steam-electric installation, turbine or by-pass system.

SUMMARY OF THE INVENTION

The invention has relation to improved methods for rapidly varying the driving power of turbines by repositioning control and intercept valves, and for simultaneously controlling the operation of steam supply systems whereby to avoid development of power system instability when jeopardized by transmission line faults and other stability endangering events, while at the same time avoiding damage to equipment.

Generator drive systems of power system steam-electric installations comprise a high pressure turbine, plus one or more low pressure turbines, plus, in the case of installations in which steam is generated with use of fossil fuel, or [a] *an* HTGR type nuclear steam supply system, one intermediate pressure turbine.

Steam reheaters are located ahead of intermediate pressure turbines, and moisture-separator reheaters ahead of low pressure turbines of nuclear *units* that utilize BWR and PWR nuclear reactor installations.

Control valves are employed to control supply of steam to high pressure turbines and intercept valves are provided immediately ahead of intermediate pressure turbines and low pressure turbines of nuclear installations that utilize BWR and PWR[.] *type reactors.*

In the U.S., at least [it,] *it* is common practice for the first stage of a high pressure turbine to be of the impulse type and for first stage nozzles to be grouped into segments with the steam supply to each segment individually controlled by means of individually operable control valves.

It also was at one time a common practice and it remains feasible to employ by-pass type control valves that admit high pressure steam to intermediate stages of high pressure turbines.

Providing to automatically momentarily close intercept valves in response to an indication of a line fault offers a way to decrease the tendency for power system generators to lose synchronism as a result of line faults and other system stability endangering events, but such momentary closure tends to increase pressure within reheaters and moisture separators, with two effects, 1. the post-fault or more generally the post stability endangering event driving power of the turbine or turbines down stream of the intercept valve or valves will exceed the pre-fault, or pre-event driving power, a circumstance which tends to adversely affect system stability, this being especially the case when the fault or other stability endangering event results in the sustained opening of one or more transmission system circuit breakers, and thereby operates to impede transmission of power in the post-fault or post-event regime, whereas actually it would normally be advantageous for the total post-fault or post-event driving power of the turbine to be held less than, and, as a rule, preferably somewhere in the range of 60 to 90 percent of pre-fault or pre-event value,
2. reheat and MSR (moisture separator and moisture separator reheater) pressure safety valves may discharge steam and in some cases may thereafter leak and require [maintainance.] *maintenance.*

One proposed approach to the solution of problem (2) above is to speed up the process of intercept valve reopening, while another is to raise the setting of the reheater and MSR pressure safety valves.

However these approaches do not solve problem (1).

[An obvious] *One* way to avoid both problem (1) and (2) is to *so* reposition control valves [so] as to *sufficiently rapidly* reduce high pressure turbine steam acceptance on a sustained basis.

*Evidently, since the object of the present invention is to rapidly bring into effect a sustained partial reduction of turbine driving power, speed of reduction of high pressure turbine steam acceptance would have to be high and extent partial.*

However, as explained under the heading of Prior Art, there has been reluctance on the part of *turbine-generator makers to provide controls that would bring into effect sustained partial control valve closure with needed rapidity.*

*In addition there has been reluctance on the part of* engineers to employ this procedure because of the conviction that it would be difficult and expensive to provide so that it could be effected without lifting of high pressure safety valves, which, when occurring, is likely to cause damage to the valves that can require scheduling a unit shutdown to allow effecting repairs.

Also, in the case of fossil fuel fired installations, there has been concern as to the feasibility of readjusting fuel, water and combustion air supply rapidly and accurately enough to prevent damage to reheaters due to overheating, and as to whether what would be done would cause objection from the standpoint of excessive thermal fatigue damage to turbines.

In the present invention the problems presented are dealt with by [providing for the] *combined* use of power operated valves that are caused to open and close in response to steam pressure and that are arranged to automatically divert high pressure steam to atmosphere or the condenser fast enough to protect against discharge of steam through high pressure safety valves when control valve closure is put into effect and by [employing a] *employment of a* method of fast valving which brings into effect jointly executed preprogrammed processes of, 1. control as well as intercept valve closure which are fast enough to have a favorable effect on generator rotor first swing stability, supplemented by rapidly executed partial reopening of intercept valves, so effected as to cause turbine driving power subsequent to generator rotor first swing to hold below the driving power that applied prior to the disturbance that resulted in initiation of fast valving, while at the same time minimizing generator rotor first backward and second forward swing, (13, 49 and 50), and avoiding lifting of low pressure safety valves, (48).
2. *in the case of fossil fuel installations,* fast runback of rate of steam production within the steam generator to a value that is low enough that diversion of steam to atmosphere or the condenser [would] terminates[.], *with* implementation of control and intercept valve repositioning taking the form of some or all of several types of procedures as listed below, a. fully closing all or only some control valves in a fraction of a second by rapidly opening valve actuator oil dump valves,
b. fully or partly closing all control valves under servo control,
c. after initial full or partial closure of all or some control valves, repositioning under servo control,
d. supplementing item (c) by fast partial control valve reopening effected with ½ second of initiation of closure with control of extent of reopening determined with use of metering cylinders or with servo or cam operated valves,
e. fully closing all intercept valves in a fraction of a second by rapidly opening valve actuator oil dump valves, or
f. fully or partly closing all intercept valves under servo control,
g. after initial full or partial closure of intercept valves, fully reopening within a period of some seconds,
h. supplementing item (g) by fast partial intercept valve reopening initiated somewhat in advance of the instant of generator rotor first forward swing, and effected with ½ second, with extent of reopening determined with use of metering cylinders or with servo or cam operated valves.

In addition it is a feature of the method of fast valving that comprises the present invention to optionally preprogram processes for effecting sustained reduction of turbine driving power which would tolerate short term discharge of steam through low or reheat pressure safety valves, and in this way avoid or minimize need to close control valves, and to provide fast means of diversion of high pressure steam.

A main object of the invention is to allow, via provision in generating station design, so that power transmisson lines can be subjected to higher transmitted power loadings than could otherwise be employed without a consequent increase in hazard of development of system instability on the occurrence of line faults and certain other system stability endangering events.

Another object is to increase the amount of power than can be safely transmitted over a right of way of given width.

A further object of the invention is to allow increasing the amount of power than can be transferred over a line operated at a given voltage.

Another object of the invention is to provide so as to minimize hazard of development of system instability in the event of infrequently occurring severe contingencies such as delay in fault clearance.

Another object of the invention is to achieve the above objectives in a manner that minimizes generating station first and operating costs including costs related to providing for steam by-passing and for discharging steam to atmosphere via power operated valves, and that avoids need to take generating units out of service to allow repairs.

Another object of the invention is to provide improvements in generating station design which increase effectiveness and eliminate or minimize penalties in employment of fast turbine valving, whether or not supplemented by employment of dynamic braking, whereby to prevent cascading type system instability.

Still another object of the invention is to avoid development of system instability subsequent to the occurrence of first generator swings following a line fault or some other system stability endangering event.

Still another object of the invention is to avoid situations where, even though a generator remains in synchronism following a fault on a line tieing it to a system, the disturbance resulting from the fault has the effect of causing loss of synchronism of some other generator or generators.

It is an important element of the invention that it can be usefully employed as an aspect of a process of combined fast valving and momentary application of braking load.

BRIEF DESCRIPTION OF THE DRAWING

The subject matter which is regarded as the invention is capable of being implemented in a variety of ways. In practice what is necessary to facilitate its employment is to devise ways to apply it in power system steam-electric installations of already developed types, with a minimum need to introduce changes in design that would be costly and time consuming to put into effect.

Therefore the drawings have been prepared in this context.

In the drawings

Figure 1:
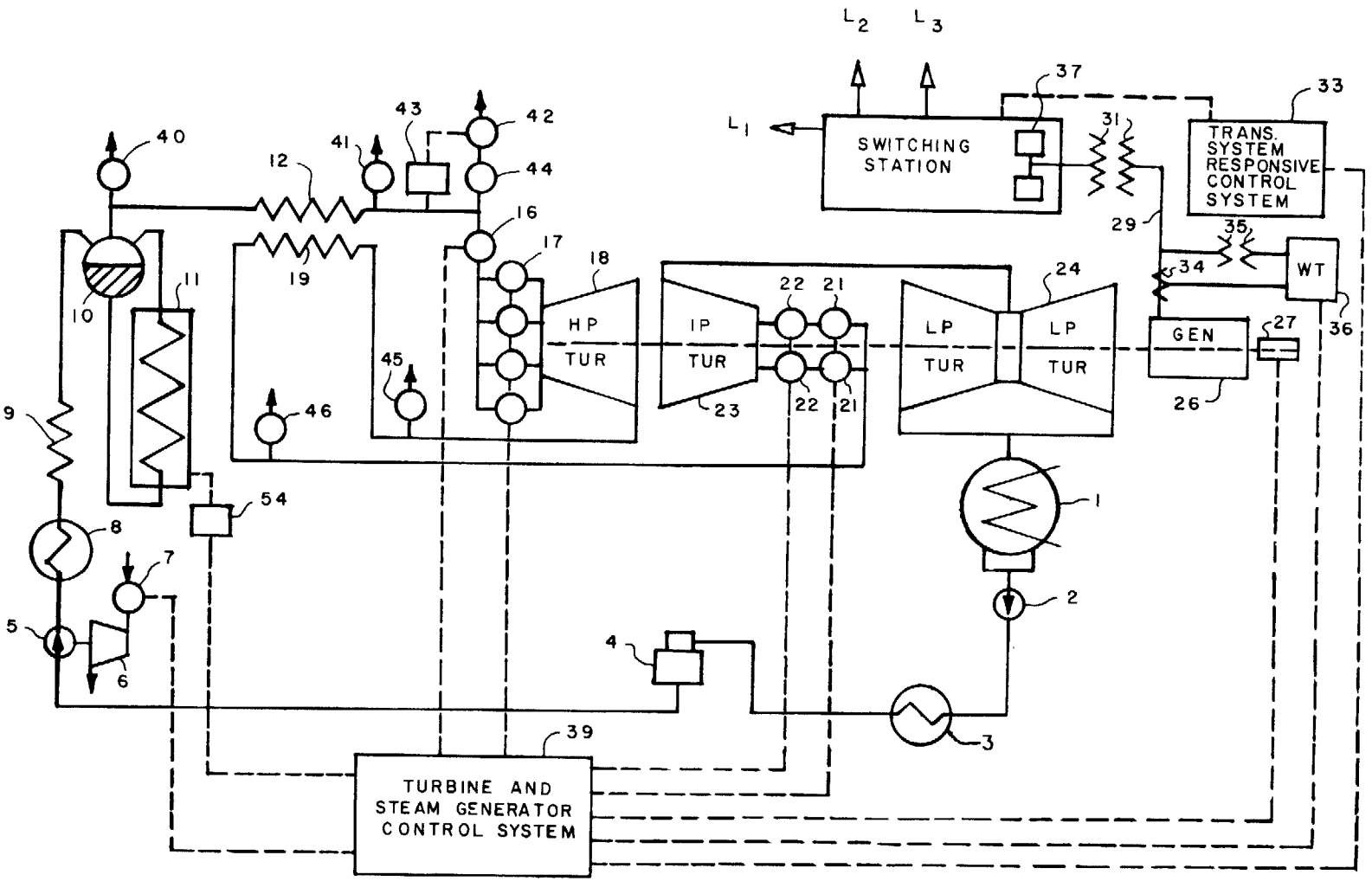
Figure 2:
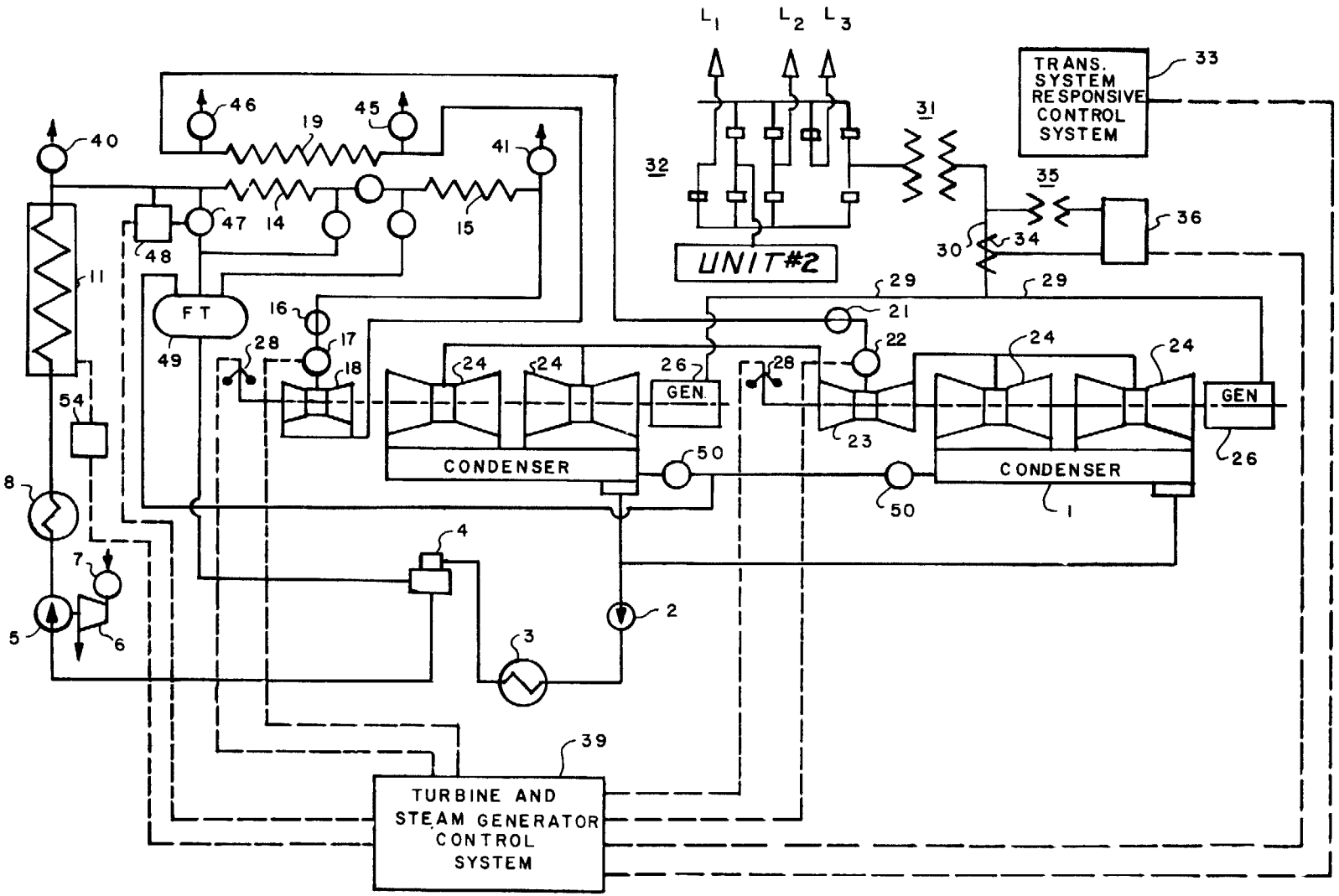
Figure 3:
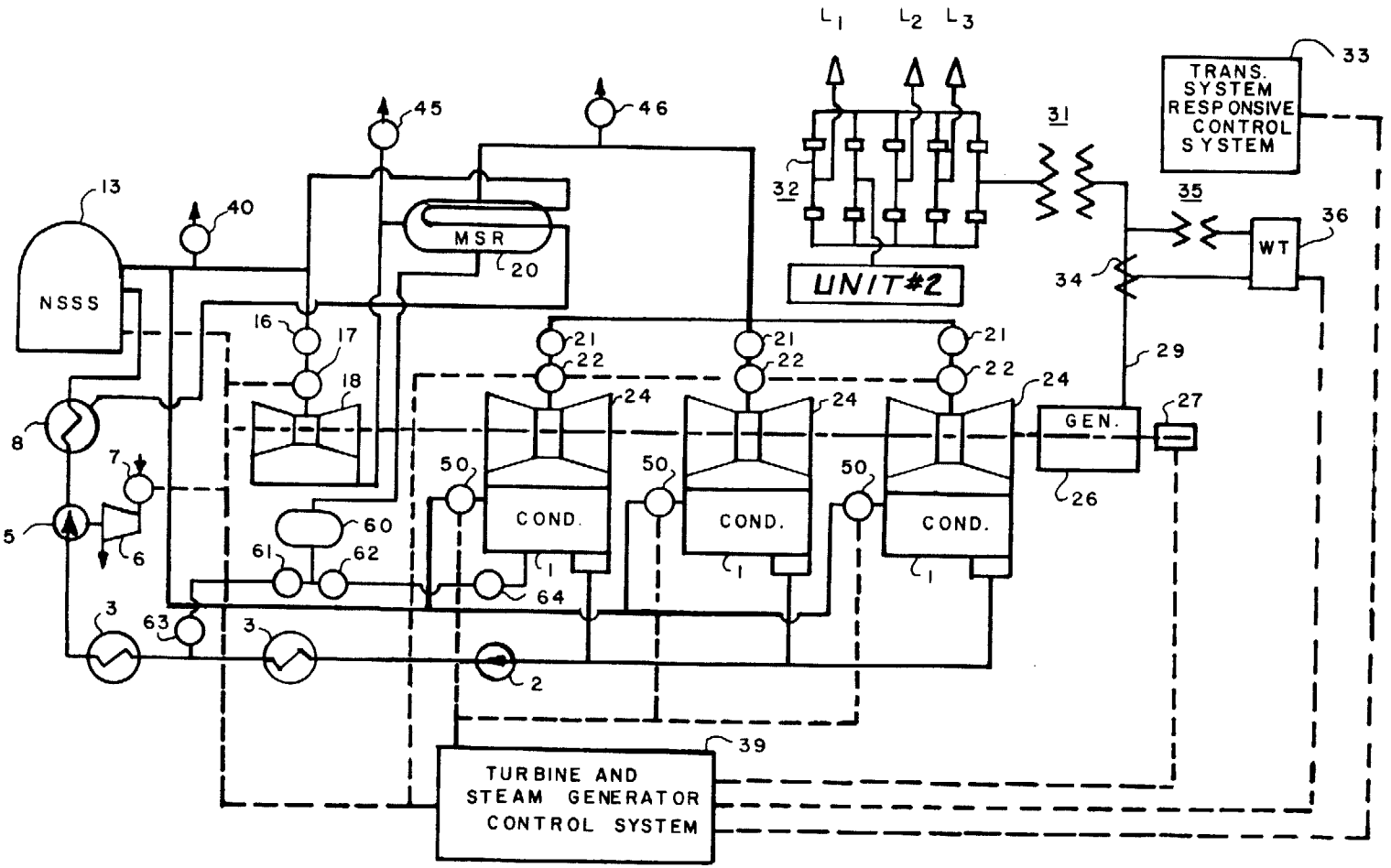
Figure 4:
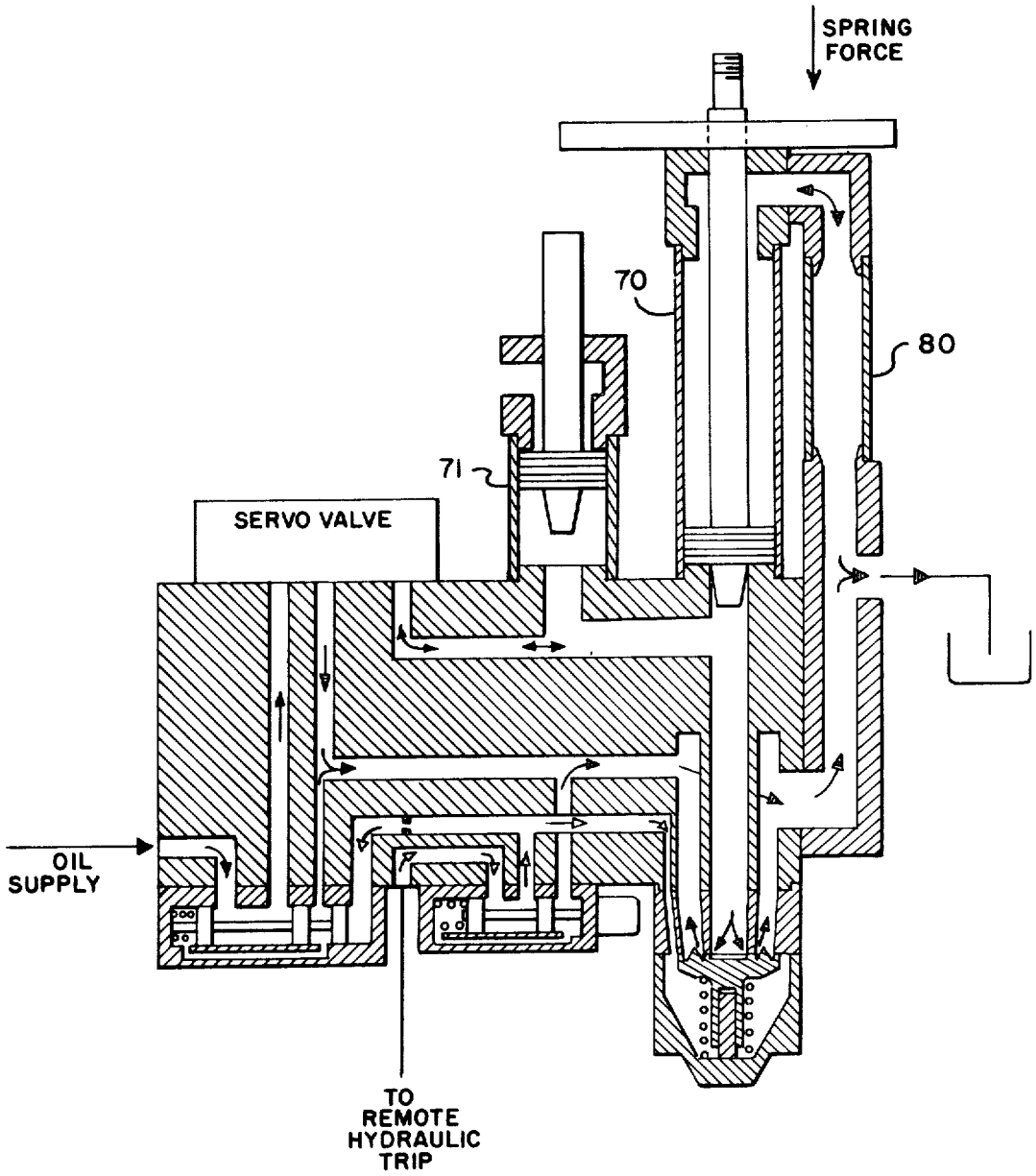
Figure 5:
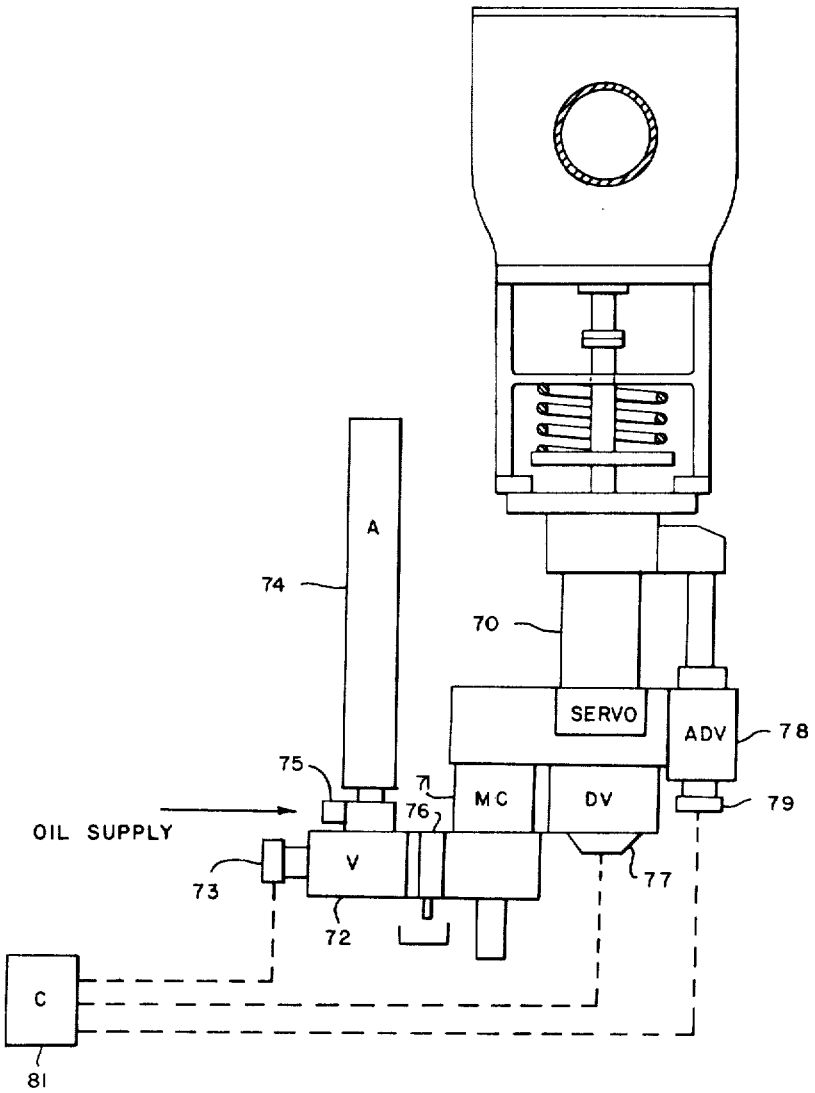

FIG. 1 is a simplified schematic view of a typical fossil fuel type steam turbine driven generating unit of U.S. design to which is coupled a drum boiler type of steam generator, FIG. 2 is a simplified schematic view of the No. 2 unit of [TWA's] *TVA's* Cumberland generating station in which a Brown Boveri cross compound turbine receives its steam from a Babcock & Wilcox once through steam generator, FIG. 3 is a simplified schematic view of a large nuclear turbine which is supplied with steam from a nuclear steam supply source which could be of either the boiling water (BWR) or pressurized water (PWR) reactor type, FIG. 4 is a simplified partial representation in schematic form of an arrangement adapted to rapidly reopen a closed turbine steam admission valve but do so part way only, FIG. 5 represents an exterior view of [an] *the stop valve portion of a combined and intermediate pressure stop* valve that has been provided with means for effecting fast partial reopening.

DESCRIPTION OF THE PREFERRED EMBODIMENTS

In FIG. 1 water that has drained down to the bottom of condenser 1 is pumped by pump 2 through low pressure feed water heater system 3 to deaerator 4 from which point it flows to boiler feed pump 5 which is driven by boiler feed pump turbine 6 which receives steam from one or more sources not shown through valve system 7.

From the boiler feed pump water passes into high pressure feed water heater system 8, next to economizer 9 and next into drum 10 from which it passes to the bottom of and up through furnace 11 and returns to the drum as wet steam.

The steam so produced next passes through superheater 12, stop valves 16 shown for convenience as a single valve, but normally consisting of four valves one being series connected to each of four control valves 17 of partial admission type high pressure turbine 18, wherein the nozzles ahead of the control stage of the turbine are divided into four segments which are supplied with steam individually through the four control valves.

After passing through the control valves and the turbine the steam enters reheater 19 and from there flows through a pair of stop valves 21 and series connected intercept valves 22, and then into intermediate pressure turbine 23 and from there to low pressure turbine 24 and from there flows into the condenser where it is reconverted to water. The three turbines are coupled together in line and drive generator 26 which supplies three phase power to three transformers 31 through generator output leads 29. In the transformer 31 the voltage is stepped up from typically around 22,000 volts to a voltage which is today typically in the range of 345 to 500 kv, and can range up to 765 kv.

The transformer connects to switching station 32 through a pair of circuit breakers 37 and 38, shown conventionally as square boxes, which are to be understood to represent two of a larger number of circuit [brakers] *breakers* not shown in the drawing by which the generator makes connection to transmission lines $L_1$, $L_2$ and $L_3$ and, in the bulk of cases, also to at least one other generator located within the same station that houses the generator shown.

Transmission system responsive control system 33 is to be understood to incorporate a protective relaying system which acts to cause the opening of circuit breakers at which lines terminate, on the occurrence of line faults, and in the case of certain other events, and is to be understood to incorporate also fast valving signal generating and logic means which may and usually would be made responsive to one [or,] *or* more parameters of system prefault or more generally pre-system disturbing event system conditions, such as lines not in service and the magnitude of generated and transmitted power, plus the fact of occurrence of a fault or other event of a type that could endanger system stability, which in the case of a fault can depend on fault type and location, while also the control system may be arranged to respond to the occurrence of a stuck breaker or some other post instant of fault initiation event, or to the extent and distribution of line fault induced reduction in power flow over one or more lines, or in respect to the extent and rate of reduction of the power output of generators, (57, 58).

Procedures of these types and others directed to determining when to initiate and to modify fast valving cycles have already been described in several patents (3, 21, 22, 23, 46, 54) one of which has already expired, while certain additional procedures are described in the writer's pending U.S. Pat. application Ser. No. 244,594.

In addition control system 33 usually receives information by carrier current or some other channel of communication which has relation to power flow over intra and inter system tie lines and as to the power output of other generators located in and remote from the station, which information is used to develop a signal that is created for the purpose of suitably modifying the load reference to the turbine's control system so as to cause the turbine to become a participant in programs of tie line power flow control and system economic dispatch (53).

Also [as shown by the dotted line connecting] *the output of* polyphase watt transducer 36 which is connected to current transformers 34 and potential transformers 35 and which generates a signal proportional to generator power output [,] *may be utilized as an input to* control system 33 [receives such a signal as one of its inputs].

Turbine and steam generator control system 39 receives as inputs the outputs of generator rotor speed transducer 27, which usually appears in the form of a frequency signal which is generated by a magnetic pick-up which is influenced by a toothed gear on the generator shaft, and in addition receives as inputs an output from watt transducer 36 and outputs from transmission system responsive control system 33 which take the form of turbine governor load reference modification signals generated as aspects of tie line and economic dispatch control systems and also one or more types of signals which initiate fast valving, or that may relate to what will be preprogrammed to be done when fast valving is initiated.

Thus the dotted line that in FIG. 1 runs from transmission system responsive control system 33 to turbine and steam generator control system 39 is to be understood to include as a minimum two channels of information transfer namely one that is used to modify the turbine's load reference system as an aspect of tie line and economic dispatch control systems and at least one fast valving signal transfer channel.

However it is also to be understood that optionally, in addition, the number of information channels can be expanded to allow selective initiation of more than one type of preprogrammed fast valving [cycles.] *cycle,* and to permit modification of the parameters of such programs in response to such factors as system conditions existing prior to a line fault or other system stability endangering event, and the occurrence and nature of post fault events.

Coming now to the functions of *the* turbine and steam generator control system 39 [there] *these* are in the first instance to continuously control the position of the turbine's control valves 17 and also valve system 7 of the boiler feed pump turbine 6 and boiler fuel and air supply control system 54, and in addition, *modify* the position of control and intercept valves in response to fast valving signals where the object is system stability improvement and also as an aspect of turbine overspeed control systems which systems may also provide for control of stop valves 16 and 21 though in the first instance these stop valves are controlled by emergency governors that represent a built-in feature of the turbine.

When it comes to providing to implement fast valving one useful thing to do that has not been provided for in U.S. steam electric installations to date with exceptions in the case of Four Corners (25), and TVA's Cumberland station (36) comprises, 1. effecting a process of sustained partial control valve closure with a view to avoiding development of instability on generator rotor second and following swings and in the steady state following loss of one or more lines, and as a way to avoid need to trip-off a generator such as could otherwise apply.

Also another new but desirable thing [to,] *to* do is to 2. so provide that the curve of turbine driving power versus time begins to rise at about the time that the generator rotor has attained the peak of its first forward swing so as to reduce the extent of generator rotor first backward and second and following forward swings (56).

Also a further thing that is desirable is to, 3. avoid lifting high pressure safety valves 40 or 41 in order to prevent damage that could require scheduling a turbine shutdown for the purpose of effecting repairs.

Objectives (1) and (3) tend to be in conflict in that reduction of high pressure turbine steam acceptance, such as occurs when control valves close, operates to cause increase in pressure ahead of the turbine.

However [provisions,] *provision,* between the superheater and the turbine, of one or more power operated relief valves 42 which often are arranged to make connection to the high pressure steam line ahead of the turbine stop valve through shut-off valves 44, which can shut to allow relief valve repair, and which are arranged to open when a pressure operated switch in control unit 43 senses the fact that steam pressure in the steam line exceeds a preset value lower than the pressure at which the high pressure safety valve or valves lift, and reclose when steam pressure falls below this preset value, represents one way of defeating safety valve lifting.

But, providing a sufficient number of these valves to prevent lifting of valves 40 and 41 adds to the expense of the station, and especially when, due to sluggishness of servo controlled valve repositioning, it would be useful from a fast valving standpoint to at first fully close and thereafter reposition control valves to a partially open position.

However there is a feasible way around this problem which can be viewed as obviously offering advantages once it is grapsed, but, that has not given evidence of being at once obvious to those skilled in the art, or who would profess to be skilled in the art of fast valving for system stability improvement, namely to provide to close two out of the total of four control valves that are commonly employed on partial admission type turbines, which brings with it the opportunity to rapidly reduce turbine steam acceptance to around 65 percent when starting from an initial condition of full load.

Alternatively it can be elected to provide to close only one valve, which however reduces driving power only about 8 percent or thereabouts.

Broadly the concept is to rapidly close some but not all control valves, so as to take advantage of what is feasible when partial admission is used.

Apparently there would be objection on the part of turbine producers to the rapid closure of more than half but less than all of the turbines control valves so that in practice not more than half would be so closed.

Also it is a feature of the present invention that, at the same time that a pair of control valves, or only one valve, would be rapidly fully closed by valve actuator oil dumping, the load reference of the speed governing mechanism would be rapidly reset and the dump valves rapidly reclosed so as to cause all valves to begin to move toward new preprogrammed positions under servo implememted feed back type control.

How in detail the foregoing can be provided for can be well understood by referring to U.S. Pat. No. 3,602,617 (54) which describes means for rapidly closing both control and intercept valves and for equally rapidly modifying turbine load reference.

Thus, referring to FIG. 1 of the patent, it will be seen that if provision is made to replace the unbalance relay logic therein identified as item 19 by preprogrammed fast valving logic provided within turbine and steam generator control system 39 and to initiate this logic in response to a transmission system responsive control system 33 fast valving signal output, what is wanted will be fully accomplished if a. the connections from the logic system to trigger 17 are opened in the case of two (or three) control valves, and b. the modifier is preset to bring about the desired sustained partial reduction in turbine load, rather than zero export load, such as the patent stipulates.

Coincidentally with causing control valve repositioning the fast valving signal would be arranged to suitably modify boiler fuel and water supply by temporarily disabling usual feed back controls and imposing a fast runback type of control action which will have the effect of readjusting the rate of fuel and feed water supply to new values that will be approximately in balance with the preprogrammed new sustained value of high pressure turbine steam acceptance in the post-fault or more generally in the post system stability endangering event regime, thereby causing termination of discharge of steam through power operated relief valves by virtue of bringing about a drop in steam pressure, while at the same time sufficiently effecting a reduction of the rate of heat input to the reheater as to avoid development of an undue rise in its temperature.

It is not necessary to disclose in this application the details of how runback would be done because means of providing fast runback of fuel and feed water supply, and hence steam generation, have for long been commercially available from leading boiler and/or boiler control producers and at most would require some degree of speeding up (61, 62)[.], *while also reference 67 sets forth how to implement fast reduction of fuel, and avoid undue reduction in rate of feed water flow, in the context of providing for sustained type fast valving at the Four Corners Steam Station.*

Since if valves 42 open quickly such opening will slow down pressure build up in the superheater, in the interest of getting maximum advantage out of each valve, and hence minimizing the number that would need to be provided to prevent lifting of high pressure safety valves 41, it can also be useful to provide, as via energization of a quick closing time delay reopening relay, so that the fast valving signal causes control units 43 to immediately open valves 42 on a feed forward basis rather than in response to pressure rise, and retain them in open position for a period long enough for the preprogrammed reductions in fuel and feed water supply to take full effect, which perhaps would require a minute or more.

In the U.S. up to now, except at Four Corners and in TVA's newer stations, only the simplest form of fast valving has been provided by turbine-generator manufacturers as a response to customers requests for provision of fast valving as a means of system stability improvement, namely a system in which intercept valves only are repositioned momentarily.

In the case of GE what has been offered has conformed to what is shown in the upper part of FIG. 6 of U.S. Pat. No. 3,601,607 (54) in which initiation of fast valving depends on the magnitude and rate of increase of an unbalance between prefault turbine driving power and generator electrical load under fault conditions.

Actually response to this type of signal tends to be insufficiently selective (59, 64) and for this reason it can be useful to employ a fast valving initiation signal provided by a transmission system responsive control system as a permissive control that would supplement response to generator power-load unbalance (64).

Where the fault condition occurs on a radial line or on a weak tie to other systems, control system 33 can recognize this fact, as also the prefault load on the line and from this information, if warranted, generate a fast valving signal that calls for only a small partial sustained or perhaps no sustained reduction in turbine driving power, and perhaps for fast full closure of only one control valve by valve actuator oil dumping, while, if a fault occurs on a strong tie that is carrying a heavy load, system 33 can recognize this condition and generate a signal that calls for a rapid closure of two or even all control valves by means of dump valve action (31, 32, 59).

Coming now to providing for fast partial reopening of intercept valves, as a first step it is necessary to provide so that when they are employed intercept valve actuator oil dump valves reclose before reopening can be started, and since it is desirable for intercept valves to begin to open somewhat in advance of the first forward swing of the generator rotor, (48, 50) and since time is required in which to bring about valve acceleration in a reopening direction, it works out that in situations where generating stations are interconnected by short lines of extra high voltage, that it can be desirable for dump valves to reclose in as little as 0.05 to 0.10 seconds following intercept valve closure.

Present GE dump valves which confirm in design to what is shown in U.S. Pat. No. 3,495,501 (55) and are spring loaded to close, do not reclose until almost a second after the intercept valve closes.

However Westinghouse dump valves which are power operated to reclose do so as rapidly as required, and dump type valves also are commercially available that are equally fast.

Therefore there is nothing to prevent GE from providing sufficiently rapidly acting dump valve means.

Since Westinghouse usually does not control its intercept valve actuators with servo control, and since GE's servo control is slow acting, to achieve the objective of rapidly implemented partial reopening, effected shortly after the peak of the generator rotor first swing, in addition to providing to rapidly reclose intercept valve actuator oil dump valves, it is necessary to provide, via oil accumulators, so that the oil needed to partially reopen the valves can be supplied rapidly enough to cause them to partially open with sufficient speed, and also provide so that the process of rapid opening terminates when the valves reopen only part way, as say when they are 25 to 50 or perhaps 60 percent open *on an effective area basis* (50).

In the matter of limiting the extent of high speed reopening, one approach that could be employed, would be to provide to admit oil to the valve actuator cylinders through position operated tapered spool decelerating type valves, *such* as are commercially available, that would be arranged to close in response to cam action as the intercept valve opens.

In another and perhaps simpler approach a metering cylinder can be interposed between the valve actuator and the accumulator.

FIG. 4 shows a modification of the [intercept] valve actuator mechanism shown in FIG. 2 of U.S. Pat. No. 3,495,501 which includes a metering cylinder 71 which when forced down by admission of oil at the rod end will cause oil to flow into valve actuator cylinder 70 and push its piston upward. As shown in the figure, *wherein the valve shown happens to represent a GE reheat pressure stop valve, rather than an intercept valve, in order* to avoid undesirable impact effects the piston of the cylinder is provided at the bottom with the same type of decelerating device, taking the form of a tapered spear protruding from the bottom of the piston, that is provided at the bottom of the actuator piston.

In FIG. 4, for ease of inclusion in the diagram, the cylinder has been shown mounted so that its rod end faces upward.

Actually it would appear to be preferable, however, to mount the cylinder with the rod end down as shown in exterior view in FIG. 5 wherein a pilot operated normally closed two way valve 72 which is electrically opened by energization of electrically controlled valve 73 provides a way by which oil stored in accumulator 74 can cause the piston of metering cylinder 71 to rapidly stroke upward thereby effecting rapid lifting of the piston of valve actuator cylinder 70.

Referring further to FIG. 5, 75 is a check valve which serves as a point at which oil can enter the accumulator from the oil supply system, while 76 is an adaptor that provides for connection of valve 72 to the metering cylinder, and that is *provided* with a bleed connection to a drain.

Item 77 represents the slow reclosing dump valve shown as item 10 in U.S. Pat. No. 3,495,501, while item 78 represents a duplicate of valve 72 which can function as an auxiliary fast reclosing dump valve since it is arranged to by-pass oil around the piston of cylinder 70, and is activated to open by energization of electrically controlled valve 79.

By reference to FIG. 1 of U.S. Pat. No. 3,495,501 it will be noted that in FIG. 5, the [intercept] valve assembly is being viewed from that side at which steam enters the valve, which is the reason why oil return line 80 of FIG. 4, which is item 9 of FIG. 2 of U.S. Pat. No. 3,495,501, is not visible.

The concept behind the showing of an auxiliary dump valve is that if it did not turn out to be easy to modify the *dump* valve described in U.S. Pat. No. 3,495,501 so as to render it fast reclosing, this valve, *when used to control an intercept valve,* could still be retained in use as a way to provide overspeed protection, while employment of fast reclosing as well as fast opening dump valve 78 would be effected primarily as a means of implementing fast valving, though it could also be used to provide a redundant means of closing the intercept valve in response to a condition of overspeed.

In the writers concept valves 72 and 78 could comprise a commercially available very rapidly acting valve that has been widely used for controlling the operation of die casting machinery.

However despite its record of successful use the turbine producer could well prefer to use his own time tried valve as a way to perform the very important function of protection against overspeed, which being the case, the provision of an auxiliary dump valve for control of fast valving which could also function as a redundant means of initiating valve closure in response to overspeed conditions would serve the purposes of fast valving yet could in no way serve to degrade reliability of overspeed protection.

Returning now to FIG. 5, control system 81 is arranged to control the position of valves 73, 77 and 79 through electrical connections shown as dashed lines.

In service use the accumulator contains its normal complement of oil and the piston of the metering cylinder 71 is up against the rod end of the cylinder so that the piston rod is fully extended downward. Also electrically controlled valves 73 and 79 are deenergized and valves 72 and 78 closed.

It is provided that, *when used to control an intercept valve,* when an event occurs that results in a fast valving signal input to control system 81, valve 79 is energized, which causes valve 78 to open with the effect that the intercept valve closes.

After allowing time for closure to take place, and optionally also ensuring that it did take place by means of a feeler switch which is not shown, the control system energizes valve 73 which causes valve 72 to open whereupon the piston of metering cylinder 71 strokes upward and forces the piston of cylinder 70 to rise part way.

Next, after a delay period, valve 73 is deenergized which causes valve 72 to close and because oil can slowly drain out of adaptor 76 via its drain connection, the piston of the metering cylinder drops down at a rate governed by the rate of discharge via the drain, which is made low enough so that there is no problem of impact when the piston comes to rest at the end of its stroke, at which stage the fast intercept valve lift assist cycle is complete.

One incidental but not unimportant advantage that the metering cylinder offers relative to a decelerating type valve, that may be worthy of note, is that by providing a supplementary push button control that would act to energize electrically controlled valve 73 the metering cylinder can be from time to time stroked under normal load conditions, and by providing the accumulator with a pressure gauge and observing the pressure drop when stroking takes place it could be easily determined whether or not the accumulator contains its normal content of nitrogen and if it did not, provide to add nitrogen.

Because electrically controlled valves 73 and 79 need to be fast acting, use of an alternating current type of solenoid valve would offer advantages, which however would be in part offset by the need to supply power to these valves by means of an inverter which would take its power from a storage battery. One solution to this problem would be to employ a dc solenoid valve having laminated magnetic components as a way to avoid eddy currents which develop in solid type solenoid plungers and slow down valve operation.

Where intercept valves are of plug type as is customary in fossil fuel type turbines it works out that typically 8 to 10 percent stroke will open the valve enough to pass 35 percent of full load steam with reheat pressure at the value that applies at full load, and that around 13 to 15 percent will supply 60 percent, which means that only a relatively small volume of oil is needed when fast partial valve opening is planned, which implies in turn need to employ only a short metering cylinder and a relatively small accumulator. Also because of the small amount of valve stroking needed, where the point applies that GE intercept valves are provided with servo valves, use of a metering cylinder could be dispensed with if servo controlled stroking rate were increased from their present usual value of 10 seconds full stroke to around 2½ seconds full stroke.

Where intercept valves are not provided with means of servo control the [mtering] *metering* cylinder approach would appear to provide a relatively simple solution to the problem of limiting extent of high speed reopening.

So far what has been said on the subject of control valve operation has had relation to U.S. units having partial admission type high pressure turbines which also typically do not have provision for rapid enough stroking of valves under servo control to serve effectively as a way to bring about a reduction of high pressure turbine steam acceptance that will serve the needs of fast valving.

In cases where high pressure turbines are not equipped for partial admission and provide fast enough control valve stroking under servo control to sufficiently limit turbine speed under entire loss of load, as applies in the case of Brown Boveri units, rate of valve closure, when fast valving is initiated for purposes of system stability improvement, has turned out to be not too low to afford stability improvement based on the fact that the Brown Boveri units in question have had higher specific inertias than steam-electric units of U.S. manufacture.

With servo control available it is possible to fully or nearly fully close control valves and completely or nearly completely close intercept valves, and to also thereafter reopen both types of valves part way, provided that oil accumulators are made use of as a way to ensure sufficiently rapid valve reopening.

The method of accomplishing fast valving that comprises [nearly fully] *partly* closing and thereafter partly reopening control and intercept valves has been provided for in the case of unit No. 2 of TVA's Cumberland station, in which a 1,300 MW cross compound Brown Boveri turbine is supplied with steam by a Babcock & Wilcox once-through boiler, the general arrangement being as shown in FIG. 2 wherein like identifying numbers have like meanings to identifying numbers of FIG. 1.

Numbers not shown in FIG. 1 comprise primary and secondary superheaters 14 and 15, fly ball type turbine speed sensor 28, primary superheater by-pass valve 47, with its control unit 48, flash tank 49 and valves 50 which are arranged to open in response to an excess of flash tank pressure.

From the standpoint of fast valving the important feature shown in FIG. 2 is the nature of the primary superheater by-pass valves *provided with air filters* provided as an element of the steam generator, which, in the case of the B&W once through boiler that has been [provided,] *shown,* comprises an array of *potentially* fast acting air operated valves which, when opened, allow steam to flow to the [condenser via the] flash tank, *from which it can discharge to atmosphere through flash tank safety valves not shown in FIG. 2, while, also, optionally, provision can be made for discharge to the condenser through one or more over pressure relief valves,* and which, taken together, *when arranged to open full stroke in a period believed to be 15 seconds,* have proved to have enough flow capacity to prevent lifting of high pressure safety valves even in the event of a turbine trip-off taking place at full load (37).

The fact that these valves both offer this much steam acceptance capability, plus the fact that, unlike superheater by-pass valves provided by two other leading U.S. producers of [the] power station boilers, they are [fast acting,] *capable of being opened in 6 seconds, and presumably in 1 or 2 seconds if the hand wheels are removed,* implies that when fast acting valves are provided there [is] *need be* no objection to employing full closing of all control valves, and thereafter reopening part way under servo control over a period of up to 10 seconds which represents the time required for control valves of GE electrohydraulic turbine control units to reopen full stroke.

Thus built in fast superheater by-pass capability [eliminates] *can eliminate* need to purchase and install power operated relief valves at added cost where provision for fast valving of the sustained reduction of driving power type is being made.

As to how to provide so that B&W's fast acting primary superheater by-pass valves are caused to open when fast valving is [involved, when fast valving is] invoked [at Cumberland,] *when it came to TVA's Cumberland station,* B&W's initial approach was to provide so that they open without delay in response to development of a predetermined increase in pressure within the superheater system *above a preset value that exceeds the maximum pressure that normally obtains ahead of the valves under a condition of full load operation* and reclose progressively as pressure falls *below a preset value.*

A modified approach, *of presumed increased effectiveness that was suggested by the writer,* would be to preprogram a process of valve opening, that would be triggered by the fast valving initiation signal, [and that of presumed increased effectiveness, that was suggested by the writer, is] *that would be* designed to prevent a rise in, or to somewhat reduce pressure, and that would be followed by a process of progressive valve reclosing as pressure dropped below a preset value.

Referring now to FIG. 3, which represents a nuclear steam-electric installation, steam supplied by nuclear steam supply source (NSSS) 13 which could be of either the pressurized water reactor (PWR) or boiling water reactor (BWR) type flows principally into high pressure turbine 18 while some is diverted to the steam reheat coils located within moisture separator reheater (MSR) 20.

In the figure there is a line from the moisture separator reheater which drains to drain tank 60, from which drain water flows normally through check valve 61 and drain tank level responsive valve 63 into the low pressure feed water system 3, but can also flow to the condenser through check valve 62 and drain tank level responsive valve 64.

Whereas only one MSR [is shown,] and only one drain tank 60 and associated valving 61 through 64 is shown, it is to be understood that in actuality there are *at least* two MSRs each with its own drain tank and set of associated valves, *and there may be two* for each low pressure turbine, or in the installation shown in FIG. 3 a total of six MSRs, six drain tanks and six sets of valves.

Steam that passes through the MSRs enters 3 low pressure turbines 24 via six pairs of stop and intercept valves 21 and 22 respectively.

In PWRs item 40 represents a high pressure safety valve that discharges steam to atmosphere while in BWRs it represents a [safety valve] *a group of spring loaded relief valves* that discharges [direct] to the [condenser.] *suppression chamber of the reactor.*

Similarly, in the case of PWRs safety valves 45 and 46 are arranged to discharge low pressure steam to atmosphere, and in the case of BWRs to the condenser.

Items 50 represent groups of by-pass valves that are arranged to open in response to excess steam pressure ahead of the turbine, such as can develop when the steam acceptance of high pressure turbine 18 is reduced by closure of control valves 17.

In the case of PWR reactors of Westinghouse type, at full load steam delivery pressure falls well below pressure at no load and it results that a sufficiently brief momentary full closure of control valves 17, plus a sustained 50 percent reduction in high pressure turbine steam acceptance, will not lift safety valves 40.

On the other hand it is to be understood that if the NSSS is of BWR type the by-pass capability of valves 50 limits, to the capacity of the by-pass system, the extent of even only momentary reduction in high pressure turbine steam acceptance that can be tolerated without scramming the reactor.

For the above reasons and because by-pass capability is expensive, in the case of those BWRs which do not have 100 percent by-pass capability, which is the usual situation, and assuming partial admission units are involved, it can be essential to rapidly fully close no more than two and in some cases only one control valve.

In the case of nuclear turbines Westinghouse units employ butterfly type intercept valves which have the advantage that in closing they operate to very rapidly reduce low pressure turbine steam acceptance, but the disadvantage that when opened conventionally at a steady rate over a period of 5 seconds reacceptance of steam by the low pressure turbine is delayed for over two seconds, which, as brought out in reference 50, is disadvantageous and therefore it is important to provide via fast closing dump valves, accumulators and metering cylinders, or cam operated decelerating valves, so that the valves rapidly reopen part way, as in the range 25 to 50 percent on a flow basis within ½ second after the peak of the generator rotor *first* forward swing.

How this could be accomplished would differ in detail only from what is shown in FIGS. 4 and 5.

Whereas in the case of both fossil fuel and nuclear steam turbines the desirability of making provision for fast partial reopening of intercept valves has been stressed it could also apply that providing for fast partial reopening of control valves could prove advantageous in situations where it might serve to limit requirements as to need for additional steam by-pass capability.

In the area of problems that could arise in application of fast turbine valving to nuclear steam electric installations the GE has cautioned that fast valving, even of the type that employs only momentary intercept valve closure, could give rise to difficulties in the way of malfunction of moisture separator reheater drain systems due to the mild form of MSR depressurization that takes place when intercept valves reopen after at first initially closing.

To the extent that such a problem exists it would tend to be intensified when control valves are rapidly closed.

However there is evidence which suggests that, with proper design of MSRs and their drain systems, rapid depressurization has not, and, in the case of fast valving will not cause a problem of consequence.

Test will be needed to clarify this point.

If, following tests, a problem remained that could not be readily solved one solution would be to provide to fully close both the turbine's control and intercept valves, and, after closure, rapidly open them both to a point at which the control valve has reached its preprogrammed new sustained position, and the intercept [valve has] *valves have* reached an equally open position, on a flow basis, and providing thereafter to only slowly fully reopen the intercept valves under servo and/or rate of oil flow control, while in the case of PWR type reactors or at any rate in the case of Westinghouse PWRs this would not involve a need to provide added steam by-pass capability.

On the other hand it would represent a costly approach where BWR reactors were planned for use because it would require providing one hundred percent by-pass capability.

However in the case of BWRs, and for that matter also in the case of PWRs, an alternate approach appears to be feasible, due to the fact that it is claimed that experience to date has shown that, presumably due to the cleanliness of the steam and its low discharge velocity, low pressure safety valves of nuclear installations have not leaked following discharge of steam, whether or not they are of the pilot operated type employing teflon O-rings which are widely employed in Westinghouse PWR installations, or of the spring loaded type used by GE in BWR and also in PWR installations.

To the extent that this claim can be relied on as a guide to the future, the point would apply that it is feasible to control turbine driving power in the period following the generator rotor first forward swing, by merely providing to suitably control intercept valve reopening (52) during the entire period during which steam generation within the reactor is being reduced, and rely on discharge of steam through low pressure spring loaded safety valves to limit rise in MSR pressure.

Moreover by providing to lift these valves in response to activation of electrically controlled air operated lift cylinders (51) with the use of pressure switches which could be preprogrammed to provide control only when fast valving has been [involved,] *invoked,* the valves could be employed as a way to hold MSR pressure constant during the entire fast valving process, thereby avoiding need for concern as to the behavior of MSR drain systems.

Furthermore it might also prove feasible to extend this concept to fossil fuel installations.

In the fossil fuel case the point would apply that experience has shown that reheat pressure safety valves are less likely to be damaged by discharge of steam than are high pressure types, due presumably to the lower velocity on steam discharge.

Also there is reason to believe that providing to lift safety valves with an air cylinder, rather than merely allowing them to lift on their own in response to increase in steam pressure, also can be expected to minimize damage effects.

Therefore, and especially if steps are taken so that the boiler, superheater and reheater are kept in a clean condition (63) [tha] *the* approach of providing for control of driving power in the period following the generator rotor first forward swing via control of rate of *intercept valve* reopening could represent a workable procedure.

When it comes to how to regulate intercept valve reopening, there would remain the desirability of first rapidly opening the valves part way, and then proceeding more slowly.

When it comes to control of intercept valve position in the period following initial fast partial reopening, the point applies that for any type of steam-electric installation it is well within the skill of control system designers to provide, as with the aid of flow control devices, and/or servo systems which could be equipped with a time varying control input that could comprise a motor driven cam that varied the position of a core in a linear differential transformer, so as to effect preprogrammed processes of intercept valve reopening, such that following an initial rapid drop during the period of generator rotor first forward swing, turbine driving power would be restored to a new preprogrammed sustained value, which in the case of fossil fuel installations would preferably be selected to be somewhere in the range of 60 to 90 percent of full load value, but in the case of PWR and BWR nuclear installations, could cover a wider range, since thermal fatigue effects represent a minor factor in the life of nuclear turbines of these types, due to low value of steam temperature.

One point that has so far not been touched on relates to the fact that it is not unusual for steam driven boiler feed pumps to receive their steam from an extraction point of an intermediate pressure turbine, in which case the turbine steam supply from this source is downstream of the intercept valves and will be much reduced, if it does not momentarily disappear, when intercept valves are rapidly fully closed as an aspect of fast turbine valving.

This will result in a process of slowing down of the turbine which will operate to reduce rate of feed water supply more rapidly than the preprogrammed [extend] *extent* of reduction of heat release within the steam generator, but the speed with which this occurs will be governed by the combined specific inertia of the turbine and pump, and, especially if intercept valves are rapidly reopened part way, it has so far appeared to experts in the design of fossil fuel steam generators, that the momentary slowing down that would be experienced would not be consequential as regards effect on the steam generator.

Moreover, in any case, turbines that, at over a predetermined load, accept steam from a point downstream of the intercept valve commonly are provided with means to accept steam either or both from the cold side of the reheaters or the high pressure steam header at light loads.

Normally separate steam chests are provided as a way to allow transfer to one or other of these steam sources and it could readily be provided, and may provide desirable, to effect transfer as a preprogrammed rapidly executed step that would be put into effect in response to a fast valving signal.

Similarly, if, in the case of nuclear units, in some cases, boiler feed pump turbines draw steam from a point downstream of the intercept valve, provision can be made to rapidly transfer to the main high pressure steam supply in response to a fast valving signal.

It is believed that the foregoing has served the purpose of showing how it is feasible to preprogram fast valving procedures, involving sustained step reductions in turbine driving power, which will well serve the purposes of power system designers when it comes to providing ways to minimize generation station first cost through avoiding need to install redundant circuit breakers, and also as a way to avoid need to construct redundant lines (36).

However to complete the picture it is necessary to provide so that processes of diversion of steam to atmosphere, or to the condenser, that need to be employed as a way to prevent discharge of steam through high pressure safety valves will be terminated without too long a delay.

Actually this is easy enough to accomplish by merely providing to simultaneously rapidly reduce heat release within, and feedwater supply to, the steam generator on a preprogrammed basis, with provision to temporarily override normally utilized feed back type control systems. for Also as matters stand providing this type of control is already well within the skill of designers of steam generator control systems, whether of types that are used in fossil fuel or nuclear steam generators. Thus systems for effecting coal fired steam generator runback to the extent of 50 percent, [to the extent of 50 percent,] accomplished in a matter of 30 seconds, (62), have been provided by steam generator producers, which speed of runback is accepted as fast enough to protect the reheater when [trubine] *turbine* steam acceptance is reduced by 50 percent. Also faster runback is feasible with use of oil or gas as fuel, while provision for 25 percent runback of BWR nuclear units in a matter of 25 to 50 seconds, and of PWR units in 2 to 4 minutes, is typically feasible.

Based on the foregoing the essential feature of the present invention is viewed as comprising an explanation of how it is possible to provide in steamelectric units of U.S. type to response to events that cause sudden at least momentary reduction of generator load by rapidly [bring can,] *bringing into* effect preprogrammed [cases] processes directed to effecting sustained partial as well as momentary reduction of turbine driving power, in ways that are favorable to preservation of system stability, and with the use of techniques and equipment that are essentially already available, except to the extent that certain minor changes in equipment for controlling the rapid positioning of turbine valves represent features that are necessary to realization of full potentialities.

Moreover it is easily possible and will generally be useful to provide, within turbine and steam generator control system 39, a plurality of preprogrammed matched turbine and steam generator control processes, and to further provide so that, when an event occurs that sufficiently endangers system stability to require initiation of fast valving, generating station system responsive control system 33 will not only initiate it but will perform, in a preprogrammed way, the function of selecting for initiation one particular pair of control processes from among the available plurality of matched pairs, as for example by sending to control system 39 an input that causes initiation of a sustained reduction of driving power of 10 percent when a fault occurs on line 1, but perhaps one of 20 percent if on line 2, and perhaps one of 40 percent if, as evaluated by what is shown in U.S. Pat. No. 3,657,552, it is expected that both lines will open due to delay in fault clearance, or if one line is already open and the other open, and perhaps also initiate a 40 percent reduction when a fault occurs on line 3.

Also it is possible to provide as per what is shown in U.S. Pat. No. Re. 26,571, so that in case of unsuccessful reclosure on a faulted line, the initially selected pair of control processes are modified in a preprogrammed way, or so that the initially selected pair is modified if reclosure is successful.

TABLE OF REFERENCES

1. S. A. Staege, "Regulator system," U.S. Pat. No. 1,705,688, Issue date Mar. 19, 1929.
2. Buell, R. C., et al., "Governor Performance During System Distrubances," Transactions AIEE, Mar. 1931, Vol. 50, pp. 354–369.
3. S. B. Griscom et al., "Regulator systems," U.S. Pat. No. 1,935,292, Issue date Nov. 14, 1933.
4. S. B. Crary, "Power system stability — volume II transient stability," John Wiley & Sons, Inc., New York, pp. 194–197, 1947.
5. Mayer, "Fault initiated control of steam turbines as a means of increasing stability of power systems," Elektrichestvo, No. 13 — 1934, pp. 27–32.
6. Zdanov, "Stability of Electric Power Systems," Gosenergoisdat, 1938, pp. 293–310.

7. V. M. Gornshtein, "Improving the stability of power systems with weak ties by acting on the regulation of steam turbines," Elektrichestvo, No. 5 — 1955, pp. 27-31.

8. Murganov, B. P., "Experimental investigation of regulation of turbine of type SYK-150-LMZ," Teploenergetica, No. 4 — 1957, pp. 9-15.

9. Murganov, B. P., Teploenergetika, No. 6 — 1959, pp. 40-49.

10. Murganov, B. P., "Regulation of power of turbo-generators in power systems," Teploenergetica, No. 2 — 1961, pp. 9-13.

11. Kashtelan et al., "Response efficiency of excitation systems and the conditions for automatic voltage regulation of large turbo-generators," Elektrichestvo, No. 10 — 1963, pp. 22-31.

12. N. I. Sokolov et al., "An analogue computer study of large turbo generators in parallel operation," Elektrichestvo, No. 10 — 1963, pp. 5-13.

13. V. E. Kashtelan et al., "Increasing stability of electrical systems with help of fast regulation of steam turbines," Elektrichestvo, No. 4 — 1965, pp. 1-8.

14. A. V. Shcheglyaev et al., "Some problems of using steam dumping devices in a steam-turbine unit," Thermal Engineering vol. 12, No. 1, 1965, pp. 1-9.

15. Y. F. Kosyak et al., "Initial experience of starting and running the prototype KhTGZ K-300-240 Turbine," Thermal Engineering, vol. 12, No. 11, 1965, pp. 1-3.

16. Shubenko-Shubin et al., "The use of desuper-heaters in a boiler-turbine unit," Thermal Engineering, 1967, pp. 28-32.

17. V. A. Venikov et al., "Use of fast acting governor control of turbines as a way of improving power system stability," Elektrichestvo, No. 2 — 1967, pp. 13-21.

18. B. P. Moorganov, U.S. Pat. No. 3,421,014, Jan. 7, 1969, "Apparatus for controlling operation of turbogenerator under emergency conditions in the power system."

19. M. A. Berkovich; et al., "Automation for preventing system faults in power pools," paper 34-06, 1970 Session International Conference on Large High Tension Electric Systems (CIGRE).

20. G. A. Doroshenko et al., "Anti-disturbance automation devices for improving power systems stability," paper 34-05, 1972 Session International Conference on Large High Tension Electric Systems (CIGRE).

21. R. H. Park, U.S. Pat. No. 3,051,842, Aug. 28, 1962, "Means for maintaining stability of power transmission systems during a fault."

22. R. H. Parks, U.S. Pat. No. 3,234,397, Feb. 8, 1966, "Means for maintaining stability of power transmission systems."

23. R. H. Park, U.S. Pat. Reissue No. 26,571 of U.S. Pat. No. 3,234,397 mentioned in item 22.

24. F. P. De Mello et al., "Turbine Energy Controls Aid in Power System Performance," Proceedings of the American Power Conference, Volume XXVIII, 1966, pp. 434-445.

25. R. G. Farmer et al., "Four Corners Project Stability Studies," IEEE Conference Paper No. 68 CP 708-PWR, presented at San Francisco, Sept. 15, 1968.

26. Philip G. Brown et al., "Effects of Excitation, Turbine Energy Control, and Transmission on Transient Stability," IEEE Paper No. 70 TP 203-PWR, presented at IEEE Winter Power Meeting, New York, Jan. 25, 1970.

27. D. J. Aanstad, "Dynamic response and data constants for large steam turbines," IEEE Tutorial Course, Course Text 70 M 29-PWR, pp. 40-49.

28. W. A. Morgan et al., "Modern stability aids for Calvert Cliffs Units," IEEE Transactions on Power Apparatus and Systems, Paper No. 70 TP 147-PWR, Vo. Pas.-90, No. 1, Jan/Feb 1971, pp. 1-10.

29. C. Concordia and P. G. Brown, "Effects of trends in large steam turbine driven generator parameters on power system stability," IEEE Paper No. 71 TP 74-PWR, pp. 2,211-2,218.

30. H. E. Lokay and P. O. Thoits, "Effects of future turbine-generator characteristics on transient stability," IEEE Transactions on Power Apparatus and Systems, Vol. 90/1971, Paper 71 TP 75-PWR, pp. 2,427-2,435.

31. R. H. Parks, U.S. Pat. No. 3,515,893, June 2, 1970, "Method of improving the stability of interconnected power systems."

32. R. H. Park, U.S. Pat. application, Ser. No. 259,337, filed June 2, 1972.

33. R. H. Park, "Improved reliability of bulk power supply by fast load control," [presented at American Power Conference Apr. 24, 1968] *Proc. American Power Conf., vol. 30, 1968, pp. 1128-1141.*

34. cf Ref. 31 — column 19, para. 2.

35. W. Trassl, "Safe cycling of high-pressure steam turbines," Proc. American Power Conf., vol. 31, pp. 306-313, 1969.

[36. E. Floyd Thomas et al., "Preliminary operation of TVA's Cumberland Steam Plant," presented at American Power Conference, Chicago, May 1973.]

*36. E. Floyd Thomas et al., "Preliminary operation of TVA's Cumberland Steam Plant," Proc. American Power Conf., vol. 35, 1973, pp. 547-556.*

37. O. W. Durrant and R. P. Siegried, "Operation and control of once-through boilers during electric power system emergencies," presented to IEEE Section Meeting, Dallas, Texas, Oct. 21, 1969.

38. Reference 50 of reference 33.

39. P. J. Martin and Ludwig E. Holly, "Bypass stations for better coordination between steam turbine and steam generator operation," Am. Power Con. May 8, 1973.

40. Cushing et al., "Fast valving as an aid to power system transient stability and prompt resynchronization and rapid reload after full load rejection," [IEEE Paper 71 TP 705-PWR.] *IEEE Transactions 1972, pp. 1624-1636.*

41. Reference 24, p. 442, column 1, para. 1.

42. Reference 29, p. 2,211, column 2, para. 4.

43. Reference 27, p. 42, column 2, para. 2.

44. R. H. Park, "Fast turbine valving," paper T72 635-1, presented at Joint IEEE/ASME Power Generation Conference, Boston, Mass., Sept. 1972, IEEE Trans. on Power Apparatus & Systems, Vol. 92, *1973,* pp. 1065-73.

45. Reference 44, p. 1,069, column 1.

46. R. H. Park, U.S. Pat. No. 3,657,552, Apr. 18, 1972, column 4 lines 10 and 11.

47. R. H. Park, discussion of reference 29, p. 2,217, column 1, para. 5.
48. R. H. Park, discussion of reference 40, p. 1,635, column 2, para. 8.
49. A. C. Sullivan and F. J. Evans, "Some model experiments in fast valving to improve transient stability," IEEE Paper No. C 72 242-1, p. 1 col. 2, paras. 2 and 3, and p. 2, column 2, para. 4.
50. Reference 44, p. 1,066, column 2, paras. 2 and 3[.], *and p. 1067, paras. 2 and 5.*
51. Reference 44, p. 1,066, column 2, para. 9 and 10.
52. Reference 31, column 19, para. 6.
53. Leon K. Kirchmayer, "Economic Control of Interconnected Systems," John Wiley & Sons, Inc., Publishers, New York, 1959.
54. F. P. De Mello et al., U.S. Pat. No. 3,601,617, Aug. 24, 1971.
55. J. Kure-Jensen, U.S. Pat. No. 3,495,501, Feb. 17, 1970.
56. Reference 44, p. 1,066, column 2, para. 3.
57. Reference 44, p. 1,068, column 1, para. 11, through column 2, para. 2.
58. Reference 44, p. 1,067, column 2, paras. 3, 4, 5.
59. Reference 44, p. 1,071, column 2, H. R. Stewart discussion of reference 44, and pp. 1,071-1,073, R. H. Park response.
60. Reference 44, p. 1,067, column 1, para. 9 and 10.
61. O. W. Durrant, "Operation and control of once-through boilers during electric power systems emergencies," 1970 Proceedings of the ISA, pp. 1-14.
62. F. H. Fenton, Jr., and J. V. Pigford, "Rapid response and maneuverability are obtainable from supercritical plants," 1970 Proceedings of the ISA, pp. 15-26.
63. Reference 44, p. 1,069, column 2, para. 3.
64. R. H. Park, "Relay and Control Techniques Used To Activate Fast Steam Turbine Valving For System Stability Improvement", *Minutes of Meeting Relay Committee, Engineering Section, Pennsylvania Electric Association, Bedford, Pa., May 1974.*
65. K. H. Bieber, "Assured Power Supply With Modern Flexible Generating Units and Bypass Systems Operating At Variable Pressure in A West German Utility System", IEEE Paper No. 71 CP 708-PWR.
66. CIGRE Committee Report, "The Electro-Hydraulic Governing Of Large Steam Turbines," ELECTRA, No. 33, pp. 91, 114.
*67. A. J. Smith and George Platt, "A method for Correcting Turbine-Generator Sudden Load Loss", Instrument Society of America, "Instrumentation in the Power Industry, Vol. 14, 1971.*
*68. R. H. Park, U.S. pat. No. 3,849,666, Nov. 19, 1974.*

Thus in its broadest scope the invention is characterized by the fact that it demonstrates how it is practicable to provide so as to allow effecting sustained partial reductions of turbine driving power, of selectively determined magnitude, effected fast enough to favorably affect system stability on second and following as well as first generator rotor forward swings, and in sufficient degree to escape loss of steady state stability, while avoiding adverse consequences, and do so at moderate or little cost.

It will also be recognized by those who have read the writer's 1968 American Power Conference paper (33), as also from what is said in U.S. Pat. Re. No. 26,571 (23), that this type of fast valving can prove especially useful when combined with provision for momentary application of braking load in that braking is well adapted to effecting marked improvement in generator rotor first swing stability, but can only be used to handle second *and following* swings at the expense of added cost and complexity[.], *and taken alone fails to provide a way to deal with steady state instability.*

*Claim Terminology*

*The basic approach to improvement of power system stability that underlies what is set forth in the present application is to provide and utilize means of responding to suddenly occurring events that jeopardize power system stability by sufficiently rapidly reducing the driving power of at least one power system generator prime mover.*

*To accomplish this result delay in initiating valve closure and time to close, once closure is begun, are preferably made such that valves close fully in ¼ second or less.*

*Going back into history, in the Staege patent (1) wording of claim 2 is*

> *"2. In a power-transmission system, a power circuit, a generator connected to said power circuit, a prime mover for driving said generator, and means for increasing the stability of said transmission system comprising means operative upon abnormal power-circuit current for reducing the flow of motive fluid to said prime mover."*

*Subsequently in the Griscom and Wagner patent (3) in claim 5 the statement is*

> *"5. In a transmission system, a synchronous generator, a transmission line connected thereto, said line having a fault-responsive sectionalizing means, a prime-mover for supplying mechanical power to said generator, and electric fault-responsive means for temporarily altering the available generator-turning power delivered to said generator within a time which is small in comparison to the half-period of oscillation of the system, the direction of alteration being such as to reduce said oscillation."*

*In the case of the Staege patent the disclosure calls for restoring driving power to its predisturbance value after a "predetermined time."*

*In the case of the Griscom and Wagner patent both the disclosure and all claims that relate to driving power reduction refer to "temporarily" altering or reducing it or words to that general effect.*

*In 1929 and 30, at the writer's suggestion, the GE Co. carried out tests on a 50,000 kw reheat type turbine generator which demonstrated the feasibility of employing very rapid momentary reduction of turbine driving power as a way to improve power system stability (2).*

*When the writer first filed the patent application that led in due course to U.S. Pat. 3,051,842, he at first gave consideration only to new ways to make use of application of an artificial or braking load and fast momentary reduction of turbine driving power (cf claims 1 through 15), but before the patent issued he modified it to also include essentially what is covered in claim 2 of Griscom and Wagner with the added provision that*

> *". . . the fault is caused to effect a modification of generator prime mover driving power characteristics whereby it results that following clearance of the fault and return to steady power flow conditions the amount of power transmitted over the transmission system from the generating segment to the receiving segment is reduced relative to conditions obtaining just prior to the fault." (cf column 3 lines 1 through 8).*

*What the writer had added was the very important concept of effecting a driving power reduction that was not merely rapid enough to favorably effect power system stability during the first forward swing of the generator rotor following a line fault, which is to say within the first half-period of oscillation of the system, as in Griscom and Wagner, but that also operated to hold driving power in the post fault period below its prefault value.*

*What Staege, and Griscom and Wagner, proposed was basically new, and what the writer added was a basically new improvement over what they disclosed and claimed.*

*However when the writer was in process of writing the claims of U.S. Pat 3,051,842 he had not seen either the Staege, or Griscom and Wagner patents, and did not find himself equal to the task of writing the kind of brief strong claims that those patents incorporated, and above all he was unable to argue successfully with the then examiner that it would not, in the light of the prior art of turbine control, be obvious to anyone skilled in the combined arts of power transmission and turbine control to provide to restrict the extent of preprogrammed return of driving power to prefault value during the post fault period.*

*However as experience well demonstrated, it was not, in fact, obvious, nor, as brought out in the petition to allow a reissue of the writer's second patent, was it obvious that, as proposed in that patent, there are special advantages in combined employment of fast valve action of the sustained reduction of driving power type, and momentary application of a braking load.*

*What has been at stake is that the writer proposed two entirely new techniques of improving power system stability, which can be briefly characterized as*

*a. sustained reduction of driving power type fast valving, or more simply "sustained type fast valving" and*

*b. the combination of sustained type fast valving and braking,*

*which, from the start offered an important potential to allow either improving reliability of bulk power transmission, or minimizing need to construct power transmission lines.*

*However it turned out to be very difficult to evoke interest in these concepts because of what the writer has termed "the power technology education gap", which relates to the fact that, almost without fail, mechanical engineers do not understand what determines power system stability, and electrical engineers usually know relatively little about steam turbines and steam generators.*

*Knowledge in these areas has tended to be closely compartmented, this being somewhat more true in the U.S. than on the continent of Europe, where turbine producers have tended to produce boilers as well.*

*As the writer began to work toward the implementation of his concept of use of very rapidly effected sustained type reduction of turbine driving power as a means of improvement of system stability, he encountered the situation that, whereas power transmission system planners could be easily convinced of the merit of what he proposed as a way to improve stability and minimize need to build lines, turbine and boiler people raised objections which, in time sequence, were to the effects that what was proposed would*

*A. cause lifting of and damage to safety valves,*

*B. cause objectionable thermal fatigue effects,*

*C. require changes to turbine control systems,*

*D. cause objectionable steam generator transients,*

*E. cause*

*1. greater control complexity,*

*2. additional duty on intercept valves,*

*3. more severe duty on intercept valves,*

*4. a burden of drain system instability,*

*5. certain blowing of MSR pressure relief valves, item E above representing the recently stated position of the GE Co's turbine people as regards fast valving generally, whether of the momentary or sustained reduction of driving power type.*

*Because of these objections it became necessary to find remedies.*

*Also, as time went on, refinements were added, such as provision to at first employ momentary fast valving, but, in certain situations, within a fraction of a second, convert to sustained type (46) or vice versa (68), and also to alter the extent of preprogrammed sustained driving power reduction with a fraction of a second of initiation of fast valving.*

*The present application deals with a particular set of ways of avoiding adverse effects on safety valves, turbine valves, and steam generators when fast valving of the sustained reduction of driving power type is made use of as a way to preserve system stability when threatened by events such as, but not limited to, line faults, when the event could operate to cause instability.*

*Therefore it depends on use of the basically new concept of responding to suddenly occurring events that could adversely affect power system stability by doing things that initiate a sustained type reduction of turbine driving power that is adapted to take place fast enough to serve the purpose of helping to prevent development of system instability.*

*When it comes to the hardware, naturally each turbine producer prefers to utilize the hardware that he already has developed and is supplying.*

*In the U.S., GE and Westinghouse use valve actuator oil dump valves to effect very rapid valve closure, and these dump valves have to be closed before reopening can begin.*

*GE's dump valves reclose much more slowly than those of Westinghouse, but this is merely objectionable and not necessarily fatal to success especially when braking it utilized.*

*Continental European turbines, or at least those of the Brown Boveri Co., use large servo valves as a way to cause fast valve closure.*

*Westinghouse large nuclear turbines are especially in need of provision to rapidly reopen their butterfly type valves and, at the instance of the TVA, Westinghouse is currently in process of providing for fast opening.*

*To attain desirable speeds of opening, oil pumps such as are normally employed to supply oil for valve reopening purposes, have to be supplemented by oil accumulators.*

*Also, in order to add the useful feature of fast partial reopening of intercept valves, if large enough servo valves are not available, they must be provided, or otherwise cam operated decelerating valves or metering cylinders as described in this application can be used.*

*Also where intercept valves require to be held in a partly open position on a sustained basis, ability to so operate without valve damage is required.*

*The details of how these things can be done, and are being done in the case of TVA steam-electric installations, are unimportant because there are many ways to proceed and each turbine control system designer and each valve designer is free to use whatever approach in his opinion suits best in his case.*

*In the course of conversations with the key turbine control and valve designers of GE, Westinghouse, and Brown Boveri, except when it came to provision for fast opening of large valves of nuclear turbines against full MSR pressure, there has never been any question as to the feasibility of providing features that the writer has called for if only,*

*a. there is a genuine economic advantage in their use,*

*b. adverse effects contingent on their use can be avoided.*

*With this in mind, and to render the claims easy to read, it has appeared advantageous to employ a claim wording that does not go into detail when it comes to what in the prior art is available and would be made use of.*

*Griscom and Wagner patent claim number 5 used the terms*

*". . . means for temporarily altering the available generator-turning power delivered to said generator within a time which is small in comparison to the half-period of oscillation of the system . . ."*

*In the context of the present application this wording could be paraphrased to read as below*

*- means for effecting a sustained reduction of the driving power of the turbine within a time period which is small in comparison with the half period of oscillation of the system -*

*However this phraseology would be too narrow*

*a. first because ordinarily in would be desirable for driving power to sustain at approximately the value that would be arrived at at the end of the half-period of oscillation and*

*b. second because as brought out in references 23, 46, and 68 there are exceptions to the rule.*

*Thus, what needs to be done varies from situation to situation, while also as brought out in reference 23, 31, and 32, it can be advantageous to boost rather than reduce driving power.*

*In general there are several situations in which it is useful to reposition turbine valves as rapidly as possible, and it follows that there can be an advantage in providing a common way to characterize this type of valve action.*

*To have a simple terminology the words "fast turbine valving" have seemed best to fit the bill (64).*

*Historically the first, and still the most important, purpose of "fast valving" has been to minimize development of overspeed, on full or partial loss of load, by rapidly closing valves.*

*Also there has always been, and remains, a need to prevent too great a drop in speed when load suddenly increases, by providing to rapidly open valves.*

*However, as a new development, fast turbine valving can also be used "as a way to avoid development of system instability as a consequence of stability endangering events", and when so used can be employed in two ways, as below,*

*a. reduce turbine driving power by closing valves, in the case of "development of stability endangering events of a type adapted to cause a generator to experience a sudden at least momentary reduction of load",*

*b. to increase turbine driving power by opening valves in the case of events of a type adapted to cause a generator to experience a sudden increase in load*

*while those skilled in the art of turbine control know how this can be done, by "providing within the turbine's control system for a predetermined response to a fast valving signal input which response will comprise a preprogrammed process" of valve repositioning.*

*Now, in the above, it is to be understood that a turbine's control system can incorporate more than one preprogrammed process of fast valving in response to a fast valving signal, as is well brought out in reference 54, which comprises GE Pat. 3,601,617, and in which provision is made to effect fast valving, both*

*a. for overspeed protection, and*

*b. for improvement in system stability, with valve behavior dependent on which of two types of fast valving signals has been generated, program (a) being made responsive to a fast valving signal generated as a result of a sudden full or partial loss of station load not involving a line fault, and program (b) being made responsive to the occurrence of a fault.*

*Also, as brought out in the writer's various patents and publications that deal with fast valving for stability improvement, the nature of the preprogrammed valving cycle can be automatically varied in dependence on such factors as prefault transmitted load (21), the occurrence or non-occurrence of a prefault after reclosure of faulted line circuit breakers (22, 23), the trip-off of generators, and the opening of intersystem ties (31, 32), the development of delay in fault clearance (46, 68), and the type and location of line faults (44, 64), and that in these connections it can be desirable to provide, as described in (64 and 68), so that when a fast valving signal is generated in response to a system stability endangering event the signal is made available, selectively, as an input to one of a group of two or more turbine control system fast valving signal input channels, each of which, when a signal is received, activates a different portion of the turbine's control system, and brings into effect a different type of preprogrammed fast valving cycle.*

*Whereas not made explicit in the claims it is to be understood that normally, as shown in the figures, the power delivered by alternating current generators is stepped up in voltage by generator transformers, and delivered via circuit breakers, to transmission systems which serve to interconnect the generator with other generators, while also the point will apply that large steam turbines of compound type invariably receive their steam from steam generators.*

*Where, as in some cases, direct current lines or ac-dc-ac back to back converters are made use of, advantage in fast valving for stability improvement can fail to apply, but this will not be the case where the turbine generator that would be fast valved is united to other generators by a "plurality of alternating current transmission circuits".*

*Where in the above, and in the claims, use is made of the word "preprogrammed", what is to be understood is that where valve repositioning is involved, on energization of some sort of trigger device, spring loaded valves will close in a manner that will be entirely determined by the design of the valves, springs, and valve actuator oil discharge means.*

*Also it will be provided in advance that the reopening process will begin at a preset point in time following the end of the closing process.*

*Further there will be advance provision that will determine the nature of the stroke of the valve versus time, during the opening process.*

*It will also be understood that a "preprogrammed process of signal generation" and "control system fast valving input signal channel selection" implies advance determination of what will take place.*

*The word "sustained" is used in the claims in the context of a "preprogrammed process of sustained type partial control valve closure" and is to be understood to mean that the valve ends up in a partially closed position, and will remain there unless and until something that was not preprogrammed takes place.*

*The words "reopening to the extent of 25 percent on a flow basis" are to be understood to mean reopening valves to a point at which, with normal full load pressure ahead of them applied, they will pass 25 percent of rated full load flow, at which point they could equally well be said to be 25 percent open on an effective area basis.*

*The word "rapidly" was employed in claim 19 so as to conform to the wording of the supporting statement in the*

*specification which will be found midway of column 20 of the original patent. Under Summary of the Invention, there is reference to "rapidly executed partial reopening of intercept valves" (cf lines 39 and 40 of column 8 of the original patent), while at the top of column 20 reference is made to "rapidly reopening part way within ½ second of the generator rotor first forward swing". This last statement serves in the specification, as also in claim 11, as amended, as a definition of what is meant by rapid partial reopening, and represents the meaning intended in claim 19.*

*The words "overheating the reheater", employed in the claims are to be understood to mean providing to avoid increasing the temperature of the reheater to an extent, and for a period, that would cause damage effects.*

*In general accord with boiler control terminology, the words "a process of progressive valve reclosing as pressure drops below a preset value", as used in claim 25, are to be understood to embrace either or both a process of reclosing that is caused to take place progressively over a period of time, or a process in which the extent of reclosing effected is made to depend on the extent of pressure drop below a preset value.*

Based on the above, what I claim is:

1. In a steam-electric installation which incorporates *an alternating current type generator driven by a compound type steam turbine incorporating control valves ahead of the high pressure turbine, and intercept valves ahead of the turbine or turbines that receive steam from the discharge of the high pressure turbine, which installation also incorporates a fossil fuel type steam generator equipped with* a reheater, *and also one or more* power operated relief valves located ahead of the high pressure turbine, which are so controlled as to open and discharge steam to atmosphere when pressure ahead of the valve or valves exceeds a preset value that is less than that at which the turbine's high pressure safety valves are set to open, and to reclose when pressure falls below a preset value which exceeds normal operating pressure ahead of the turbine, *the generator of* which installation [is part of] *makes connection to* a power system which includes a plurality of prime mover driven generators, which generators are interconnected by a plurality of *alternating current* transmission circuits, the method of employing fast [turbine] valving as a way to avoid development of system instability [as a consequence of stability endangering events of a type adapted to cause the generator of the said installation to experience a sudden at least momentary reduction of load,] which comprises the steps of, 1. providing within the turbine and steam generator control system, for response to a fast valving initiation signal input by bringing into effect preprogrammed jointly effected processes of,
   a. *at least partial* intercept valve closure effected fast enough to have a favorable effect on generator rotor first swing stability, and control valve repositioning plus intercept valve reopening so effected as to cause turbine driving power subsequent to generator rotor first forward swing to hold below a preset value that is less than the driving power that applied prior to the event that brought about development of the signal,
   b. runback of rate of steam production within the steam generator to a value that will cause termination of [the] *whatever* discharge of steam through said power operated relief valves [that will] *may* at first take place, with provision so that said runback is effected rapidly enough *and is otherwise so executed as* to avoid overheating of the reheater,
2. providing in a preprogrammed manner so that [a fast valving signal is generated and transmitted as an input to the turbine and steam generator control system on the occurrence of certain types of events that endanger preservation of system stability.]
   *a. a fast valving signal is generated on the occurrence of system stability endangering events of a type that cause the said generator to experience a sudden at least momentary reduction of load,*
   *b. the said fast valving signal is made available as an input to that portion of the turbine's control system that is adapted to bring into effect the said preprogrammed processes.*

[2. The method of claim 1 wherein one of a plurality of pairs of coordinated preprogrammed processes of turbine and steam generator control will be selectively activated in dependence on the nature of the stability endangering event.]

[3. The method of claim 1 in which some but not all of the turbine's control valves are rapidly closed by valve actuator oil dumping.]

[4. The method of claim 1 in which half of the turbine's control valves are rapidly closed by valve actuator oil dumping.]

[5. The method of claim 1 in which one quarter of the turbine's control valves are rapidly closed by valve actuator oil dumping.]

6. In a steam-electric installation incorporating [a U.S. type] *an alternating current type generator driven by a compound type steam turbine incorporating control valves ahead of the high pressure turbine, and intercept valves ahead of the turbine or turbines that receive steam from the discharge of the high pressure turbine, which installation also includes a reheater, and also a* once-through boiler, one or more power operated valves that are arranged so that when opened they provide a path by which steam can by-pass from a point ahead of the turbine to the flash tank of said boiler, [and from thence to the condenser,] which valves are subject to the control [ofa] *of* a control system which [causes] *is operative under load conditions to cause* them to open when the pressure ahead of the valves exceeds a preset value which is less than that pressure that will cause discharge of steam through the turbine's high pressure safety valves, and are also so controlled as to close when pressure falls to a preset value that exceeds the normal operating pressure of the turbine, *the generator of* which installation [is part of] *makes connection to* a power system which includes a plurality of prime mover driven generators, which generators are interconnected by a plurality of *alternating current* transmission circuits, the method of employing fast turbine valving as a way to avoid development of system instability [as a consequence of stability endangering events of a type adapted to cause the generator of the said installation to experience a sudden at least momentary reduction of load,] which comprises the steps of, 1. providing within the turbine and steam generator control system, for response to a fast valving initiation signal input by bringing into effect preprogrammed jointly effected processes, of
   a. *at least partial* intercept valve closure effected fast enough to have a favorable effect on generator rotor first swing stability, and control valve repositioning plus intercept valve reopening so effected as to cause turbine driving power subsequent to generator rotor first forward swing to hold below a preset value that is less than the driving power that applied prior to the event that brought about development of the signal, b. runback of rate of steam production within the steam generator to a value that will cause termination of *whatever* discharge of steam through said steam by-pass valves *may take place* with provision so that said runback is effected rapidly enough *and is otherwise so executed* to avoid overheating of the reheater.

2. providing in a preprogrammed manner so that [a fast valving signal is generated and transmitted as an input to the turbine and steam generator control system on the occurrence of certain types of events that endanger preservation of system stability.]

*a. a fast valving signal is generated on the occurrence of system stability endangering events of a type that cause the said generator to experience a sudden at least momentary reduction of load,*

*b. the said fast valving signal is made available as an input to that portion of the turbine's control system that is adapted to bring into effect the said preprogrammed processes.*

[7. The method of claim 6 wherein one of a plurality of pairs of coordinated preprogrammed processes of turbine and steam generator control will be selectively activated in dependence on the nature of the stability endangering event.]

[8. The method of claim 6 in which some but not all of the turbine's control valves are rapidly closed by valve actuator oil dumping.]

[9. The method of claim 6 in which half of the turbine's control valves are rapidly closed by valve actuator oil dumping.]

[10. The method of claim 6 in which one quarter of the turbine's control valves are rapidly closed by valve actuator oil dumping.]

11. In a steam-electric installation which [is part of] *incorporates an alternating current type generator driven by a compound type steam turbine incorporating control valves ahead of the high pressure turbine, and intercept valves ahead of the turbine or turbines that receive steam from the discharge of the high pressure turbine, the generator of which installation makes connection to* a power system which includes a plurality of prime mover driven generators, which generators are interconnected by a plurality of *alternating current* transmission circuits, the method of employing fast turbine valving as a way to avoid development of system instability [as a consequence of stability endangering events of a type adapted to cause the generator of the said installation to experience a sudden at least momentary reduction of load,] which comprises the steps of, 1. providing within the turbine's control system for response to a fast valving signal input by bringing into effect preprogrammed processes of, a. at least partial closure of the turbine's intercept valves, b. partial intercept valve reopening, to the extent of at least 25 percent [brought to completion] *on a flow basis, effected* within ½ second [of termination of closure, and] *after the peak of the generator rotor first forward swing, with termination of fast opening occurring when the valves are still only part way open,* followed by more slowly effected full opening executed in a manner adapted to cause turbine driving power to hold below a preset value that is less than the driving power of the turbine at the instant of receipt of the said fast valving signal input, 2. providing in a preprogrammed manner so that [a fast valving signal is generated and transmitted as an input to the turbine and steam generator control system on the occurrence of certain types of events that endanger preservation of system stability.]

*a. a fast valving signal is generated on the occurrence of system stability endangering events of a type that cause the said generator to experience a sudden at least momentary reduction of load,*

*b. the said fast valving signal is made available as an input to that portion of the turbine's control system that is adapted to bring into effect the said preprogrammed processes.*

12. The process of claim 11, in which intercept valves in step (1), are fully closed.

13. The process of claim 11 in which intercept valve reopening is initiated within 0.1 second of completion of the closing process.

14. The process of claim 11 in which partial intercept valve reopening carried out in step (2) is effected with oil supplied from accumulators, and is terminated by operation of valves of cam operated type, with cam position determined by valve stroke.

15. The process of claim 11 in which fast partial intercept valve reopening, carried out in step 2, is effected by the transfer to the cylinder of each of the valve actuators, of a predetermined quantity of oil contained within a second cylinder.

16. The process of claim 11 in which control valves are repositioned in a manner adapted to bring into effect a preset sustained degree of partial closure, with provision so that said process of partial closure is accomplished rapidly enough, and to an extent sufficient, to prevent an increase in steam pressure ahead of the turbine's intercept valves that would suffice to cause discharge of steam through safety valves located ahead of said intercept valves.

*17. In a nuclear steam electric installation which incorporates an alternating current type generator that is driven by a compound type steam turbine in which steam received from a nuclear steam supply source passes through control valves into a high pressure turbine and is discharged as a mixture of steam and water into one or more moisture separators in which the bulk of the water is separated out and discharges into a drain system, and from there returns eventually to the nuclear steam supply source, and in which demoisturized steam is discharged from the moisture separator or separators into one or more reheaters from which it passes into one or more low pressure turbines, which it enters through intercept valves, which installation includes one or more by-pass valves that are arranged to open and discharge high pressure steam to the condenser when steam pressure ahead of the valves exceeds a preset value, and close when pressure falls below said preset value, the generator of which installation makes connection to a power system which includes a plurality of alternating current transmission circuits, the method of employing fast valving as a way to avoid development of system instability which comprises the steps of*

*1. providing within the turbine and steam generator control system, for response to a fast valving initiation signal input by bringing into effect preprogrammed jointly effected processes of, at least partial intercept valve closure effected fast enough to have a favorable effect on generator rotor first swing stability, and*

*control valve repositioning plus intercept valve reopening so effected as to cause turbine driving power subsequent to generator rotor first forward swing to hold below a preset value that is less than the driving power that applied prior to the event that brought about development of the signal,*

*2. providing in a preprogrammed manner so that*

*a. a fast valving signal is generated on the occurrence of system stability endangering events of a type that cause the said generator to experience a sudden at least momentary reduction of load,*

*b. the said fast valving signal is made available as an input to that portion of the turbine's control system that is adapted to bring into effect the said preprogrammed processes.*

*18. The method of claim 17 in which the process of control valve repositioning is so effected as to prevent an increase in steam pressure ahead of the turbine's intercept valves that would suffice to cause discharge of steam through safety valves located ahead of said intercept valves.*

*19. The method of claim 17 in which both the control and intercept valves of the turbine are at first fully closed, and, after closure, rapidly opened to a position at which the control valves have reached their preprogrammed new sustained position and the intercept valves have reached an equally open position on a flow basis, and providing thereafter to only slowly fully reopen the intercept valves under servo and/or rate of oil flow control.*

*20. In a steam-electric installation which incorporates an alternating current type generator driven by a compound type steam turbine incorporating control valves ahead of the high pressure turbine, and intercept valves ahead of the turbine or turbines that receive steam from the discharge of the high pressure turbine, which installation also incorporates a fossil fuel type steam generator equipped with a reheater, and also one or more power operated relief valves located ahead of the high pressure turbine, which are so controlled as to open and discharge steam when pressure ahead of the valve or valves exceeds a preset value that is less than that at which the turbine's high pressure safety valves are set to open, and to reclose when pressure falls below a preset value which exceeds normal operating pressure ahead of the turbine, the generator of which installation makes connection to a power system which includes a plurality of prime mover driven generators, which generators are interconnected by a plurality of alternating current transmission circuits, the method of employing fast valving as a way to avoid development of system instability, which comprises the steps of,*

*1. providing the turbine and steam generator control system with a plurality of fast valving signal input channels, each of which, when it receives a signal, will bring into effect a different pair of preprogrammed jointly effected processes of*

*a. intercept valve closure effected fast enough to have a favorable effect on generator rotor first swing stability, and control valve repositioning plus intercept valve reopening so effected as to cause turbine driving power subsequent to generator rotor first forward swing to hold below a preset value that is less than the driving power that applied prior to the event that brought about development of the signal,*

*b. runback of rate of steam production within the steam generator to a value that will cause termination of whatever discharge of steam through said power operated relief valves that may at first take place, with provision so that said runback is effected rapidly enough and is otherwise so executed to avoid overheating of the reheater,*

*2. providing in a preprogrammed manner so that*

*a. a fast valving signal is generated on the occurrence of system stability endangering events of a type that cause the said generator to experience a sudden at least momentary reduction of load,*

*b. the said fast valving signal is selectively made available to one of the said plurality of fast valving signal input channels, in such manner that the pair of preprogrammed processes that will be activated will depend in a preprogrammed way on the nature of the stability endangering event.*

*21. In a steam-electric installation which incorporates an alternating current type generator driven by a compound type steam turbine incorporating control valves ahead of the high pressure turbine, and intercept valves ahead of the turbine or turbines that receive steam from the discharge of the high pressure turbine, which high pressure turbine is of the partial admission type, and wherein there is provision to rapidly close at least half of the turbine's control valves by valve actuator oil dumping, the generator of which installation makes connection to a power system which includes a plurality of prime mover driven generators, which generators are interconnected by a plurality of alternating current transmission circuits, the method of employing fast valving as a way to avoid development of system instability which comprises, providing within the turbine's control system for response to a fast valving signal by bringing into effect preprogrammed processes of repositioning of both control and intercept valves, which include rapid closing of some but not all control valves effected with the benefit of valve actuator oil dumping.*

*22. The method of claim 20 in which half of the turbine's control valves are rapidly closed by valve actuator oil dumping.*

*23. The method of claim 20 in which one quarter of the turbine's control valves are rapidly closed by valve actuator oil dumping.*

*24. The method of claim 6 in which the steam by-pass valves which discharge to the flash tank are preprogrammed to open in response to the fast valving initiation signal, and wherein the process of valve opening would be designed to prevent a rise in or somewhat reduce steam pressure and would be followed by a process of progressive valve reclosing as pressure falls below a preset valve.*

*25. The method of claim 6 in which provision is made to allow flash tank steam to discharge to the condenser.*

* * * * *